United States Patent
Lloyd

(10) Patent No.: US 11,512,013 B2
(45) Date of Patent: Nov. 29, 2022

(54) SYSTEM AND METHOD OF REDUCING OXIDANTS IN A CHEMICAL STREAM

(71) Applicant: Ralph Birchard Lloyd, Fayetteville, NC (US)

(72) Inventor: Ralph Birchard Lloyd, Fayetteville, NC (US)

(*) Notice: Subject to any disclaimer, the term of this patent is extended or adjusted under 35 U.S.C. 154(b) by 0 days.

(21) Appl. No.: 17/024,350

(22) Filed: Sep. 17, 2020

(65) Prior Publication Data

US 2021/0078881 A1 Mar. 18, 2021

Related U.S. Application Data

(60) Provisional application No. 62/902,142, filed on Sep. 18, 2019.

(51) Int. Cl.
| | |
|---|---|
| *C02F 1/70* | (2006.01) |
| *C02F 1/28* | (2006.01) |
| *C02F 1/42* | (2006.01) |
| *C02F 1/44* | (2006.01) |
| *B01J 20/34* | (2006.01) |
| *B01J 10/00* | (2006.01) |
| *C01D 1/04* | (2006.01) |

(Continued)

(52) U.S. Cl.
CPC .......... *C02F 1/705* (2013.01); *B01J 10/005* (2013.01); *B01J 20/34* (2013.01); *C01D 1/04* (2013.01); *C02F 1/28* (2013.01); *C02F 1/42* (2013.01); *C02F 1/441* (2013.01); *C02F 2101/10* (2013.01); *C02F 2101/34* (2013.01); *C02F 2101/36* (2013.01); *C02F 2101/38* (2013.01); *C02F 2101/40* (2013.01); *C02F 2103/36* (2013.01)

(58) Field of Classification Search
None
See application file for complete search history.

(56) References Cited

U.S. PATENT DOCUMENTS 4,127,598 A * 11/1978 McEntee .................. C07F 7/20
556/454
4,666,696 A * 5/1987 Shultz .................... B01D 53/34
588/314

FOREIGN PATENT DOCUMENTS

GB      2299080 A  *  9/1996  ............... A62D 3/32
WO  WO-9403237 A1  *  2/1994  ............... A62D 3/32

OTHER PUBLICATIONS

Perfluoroalkyl Substances in the Environment: Theory, Practice, and Innovation. Chapter 11 (pp. 241-251), Chapter 12 (pp. 255-302), and and Chapter 19 (pp. 417-445). Available online Aug. 15, 2018. (Year: 2018).*

(Continued)

*Primary Examiner* — Jennifer A Leung
(74) *Attorney, Agent, or Firm* — Ashley D. Johnson; Dogwood Patent and Trademark Law

(57) ABSTRACT

The presently disclosed subject matter is generally directed to a system and method of reducing, reacting, and/or removing an oxidant or unwanted chemical species from a chemical stream. Particularly, the system and method include the use of one or more reductants that react with the undesired chemical species. The reductant and the chemical stream are added to a reactor and allowed to react for a desired amount of time. The reductant will reduce, react with, and/or remove the chemical species from the stream. The excess reductant and reaction products are then removed from the reactor, as described in more detail herein below.

15 Claims, 5 Drawing Sheets

(51) Int. Cl.
*C02F 101/10* (2006.01)
*C02F 101/36* (2006.01)
*C02F 101/38* (2006.01)
*C02F 101/34* (2006.01)
*C02F 103/36* (2006.01)

(56) References Cited

OTHER PUBLICATIONS

Kucharzyk et al. Journal of Environmental Management 204 (2017) 757-764. (Year: 2017).*

* cited by examiner

SYSTEM AND METHOD OF REDUCING OXIDANTS IN A CHEMICAL STREAM

CROSS-REFERENCE TO RELATED APPLICATIONS

The current application claims priority to U.S. Provisional Patent Application No. 62/902,142, filed Sep. 18, 2019, the entire contents of which are incorporated by reference herein.

TECHNICAL FIELD

The presently disclosed subject matter is generally directed to system and method of removing, reducing, and/or reacting a species from a chemical stream.

BACKGROUND

Contamination of the air, water and soil is a severe problem endangering the lives of many plants and animals, including humans. Specifically, compounds such as halocarbons, persistent organic pollutants (POPs), and other halogenated organic compounds or halocarbons have been deemed unsafe for release into the environment. Such chemicals are restricted in countries that have signed the Stockholm Convention, which limits POPs. Further, in January 2020, the United States House of Representatives passed PFAS Action Act of 2019 (RR, 535), which would label 5000 perfluoroalkyl and polyfluoroalkyl substances (PFAS) as hazardous. These actions indicate a growing concern around emitting dangerous compounds (e.g., fluorinated halocarbon chemicals) into the environment. Many attempts have been made to reduce contamination by treating the compounds to make them less harmful. For example, high temperature incineration using commercial hazardous waste units can be used to destroy halocarbons such as PCBs. However, the incineration is expensive, consumes hydrocarbons, and emits $CO_2$ and other pollutants to the atmosphere. In addition, when halocarbons are incinerated, the flue gas usually has to be further processed or scrubbed to remove halogen compounds. Other techniques to remove halocarbons from chemical or waste streams to avoid polluting the environment include capturing the halocarbons on activated carbon. However, this method is likewise expensive and requires the halocarbon-laden carbon to be regenerated, thus producing additional halocarbon waste streams that have to be disposed of or incinerated. Because the destruction of halocarbons is very difficult, incineration and all the problems thereof are often the ultimate solution.

In the area of hydrocarbon gas and liquid processing, such as crude oil purification, high pressure and high temperature treating of the hydrocarbons with hydrogen to break sulfur-carbon bonds (and nitrogen-carbon bonds, etc.) to facilitate the removal of sulfur and other contaminants is performed; one such process for treating liquid hydrocarbons in a refinery is called hydrotreating. The equipment and operating costs for hydrotreating are expensive due to the high temperature and pressure operating conditions that are involved, hydrogen must be produced and compressed, which is expensive, and as the residual sulfur specification gets lower and lower to meet environmental regulations, the difficulty of achieving very high levels of removal of the impurities becomes disproportionately difficult and expensive. Natural gas processing and the removal of impurities likewise becomes more difficult the lower the impurity specifications are set.

It would therefore be beneficial to provide an improved system and method of removing and/or destroying halocarbon chemical species and hydrocarbon impurity chemical species.

SUMMARY

In some embodiments, the presently disclosed subject matter is directed to a method of producing an alkali metal hydroxide from a chemical stream comprising a halocarbon. Particularly, the method comprises combining within a reusable reactor (a) one or more molten alkali metal reductants not dispersed in a carrier liquid; and (b) a chemical stream comprising a halocarbon, moisture, and optionally a non-reducible chemical species. The method includes heating or maintaining the reactor at a temperature sufficient to melt or maintain the one or more molten alkali metal reductants in a molten state. The method further comprises reacting the one or more molten alkali metal reductants with the chemical stream, wherein the moisture in the chemical stream is reduced by the one or more molten alkali metal reductants, is reacted with the one or more molten alkali metal reductants, or is removed from a non-reducible chemical species by the one or more molten alkali metal reductants. The method comprises removing the metal hydroxide reaction product and optionally a non-reducible chemical species from the reactor. In some embodiments, the removing step can be accomplished by using a mechanical mass transfer device.

In some embodiments, the presently disclosed subject matter is directed to a non-oxidative method of removing halogen, sulfur, nitrogen, or oxygen atoms from a carbon-based chemical species. Particularly, the method comprises combining within a reusable reactor (a) one or more molten alkali metal reductants not dispersed in a carrier liquid, and (b) a chemical stream comprising a carbon-based chemical species comprising a carbon-halogen, carbon-sulfur, carbon-nitrogen, or carbon-oxygen bond and optionally a non-reducible chemical species. Optionally, the method includes heating or maintaining the reactor at a temperature sufficient to melt or maintain the one or more molten alkali metal reductants in a molten state. The method further includes reacting the one or more molten alkali metal reductants with the carbon-based chemical species comprising a carbon-halogen, carbon-sulfur, carbon-nitrogen, or carbon-oxygen bond in the chemical stream, wherein the carbon based chemical species comprising a carbon-halogen, carbon-sulfur, carbon-nitrogen, or carbon-oxygen bond in the chemical stream is reduced by the one or more molten alkali metal reductants, is reacted with the one or more molten alkali metal reductants, or is removed from a non-reducible chemical species by the one or more molten alkali metal reductants. The method further includes removing the reaction products and optionally a non-reducible chemical species from the reusable reactor. In some embodiments, the removing can be accomplished by using a mechanical mass transfer device.

In some embodiments, the presently disclosed subject matter is directed to a method of producing at least one of a carbon particle or an alkali metal halide salt. Particularly, the method comprises combining within a reusable reactor (a) one or more molten alkali metal reductants not dispersed in a carrier liquid, and (b) a chemical stream comprising a halocarbon and optionally a non-reducible chemical species. The method includes heating or maintaining the reactor at a temperature sufficient to melt or maintain the one or more molten alkali metal reductants in a molten state. The method further includes reacting the one or more molten alkali metal reductants with the chemical stream, wherein the halocarbon in the chemical stream is reduced by the one or more molten alkali metal reductants, is reacted with the one or more molten alkali metal reductants, or is removed from a non-reducible chemical species by the one or more molten alkali metal reductants. The method also comprises removing the carbon particle or metal halide salt reaction product and optionally a non-reducible chemical species from the reactor. In some embodiments, an excess amount of unreacted molten alkali metal reductant remains after the reacting with the halocarbon in the chemical stream. In some embodiments, the reusable reactor comprises of at least one of a multiplicity of reactor vessels arranged in series, a reactor with a circulating loop comprising at least some unreacted molten alkali metal reductant, or a reactor partitioned into a multiplicity of reaction zones.

In some embodiments, the presently disclosed subject matter is directed to a method of reducing, reacting, or removing an oxidant in or from a chemical stream. Particularly, the method comprises combining within a reusable reactor one or more molten alkali metal reductants not dispersed in a carrier liquid, and a chemical stream comprising an oxidant and optionally a non-reducible chemical species. The method further includes heating or maintaining the reactor at a temperature sufficient to melt or maintain the one or more molten alkali metal reductants in a molten state. The method comprises reacting the one or more molten alkali metal reductants with the oxidant in the chemical stream, wherein the oxidant in the chemical stream is reduced by the one or more molten alkali metal reductants, is reacted with the one or more molten alkali metal reductants, or is removed from a non-reducible chemical species by the one or more molten alkali metal reductants. The method further comprises removing the reaction products and optionally a non-reducible chemical species from the reusable reactor.

In some embodiments, the oxidant is selected from a halocarbon, a sulfur compound, a nitrogen compound, an oxygen compound, water, carbon monoxide, carbon dioxide, an amine, a nitrogen oxide, oxygen, a cation, a persistent organic pollutant (POP), or combinations thereof.

In some embodiments, an excess amount of unreacted molten alkali metal reductant remains after the reacting with the oxidant in the chemical stream.

In some embodiments, the method further comprises mixing the molten alkali metal reductant and chemical stream using a static mixing element, a dynamic mixing element, or both.

In some embodiments, the reusable reactor is selected from a multiplicity of reactor vessels arranged in series, a reactor with a circulating loop comprising at least some unreacted molten alkali metal reductant, a reactor partitioned into a multiplicity of reaction zones, or combinations thereof.

In some embodiments, a non-reducible chemical species further comprises nitrogen gas, a noble gas, or a hydrocarbon gas or liquid.

In some embodiments, the temperature is at, near, or above the auto-decomposition temperature of the oxidant.

In some embodiments, greater than 99% of an oxidant is reduced, reacted, or removed from the chemical stream.

In some embodiments, the chemical stream is an industrial chemical plant process or waste stream.

In some embodiments, the chemical stream comprising an oxidant is a stream emanating from at least one of an absorber system, an ion exchange system, or a reverse osmosis system. The term "absorber system" refers to any system that provides for the consumption, bonding, or absorbing of one or more species. The term "ion exchange system" refers to any system that includes the exchange of ions between two electrolytes or between an electrolyte and a complex. The term "reverse osmosis system" refers to a system that employs pressure driven transport of a material (e.g., a fluid) through a semi-permeable membrane in opposition to an osmotic complex.

In some embodiments, the method further comprises generating a stream of an alkali metal hydroxide or an alkali metal hydroxide caustic solution from the reaction products.

In some embodiments, the presently disclosed subject matter is directed to a method of reducing, reacting, or removing a halocarbon in or from a chemical stream and eliminating or reducing the need for at least one of a scrubber, a carbon absorber, or an incinerator to destroy or remove a halocarbon from a chemical stream. Particularly, the method comprises combining within a reusable reactor one or more molten alkali metal reductants not dispersed in a carrier liquid, and a chemical stream comprising a halocarbon and optionally a non-reducible chemical species. The method includes heating or maintaining the reactor at a temperature sufficient to melt or maintain the one or more molten alkali metal reductants in a molten state. The method further includes reacting the one or more molten alkali metal reductants with the chemical stream, wherein the halocarbon in the chemical stream is reduced by the one or more molten alkali metal reductants, is reacted with the one or more molten alkali metal reductants, or is removed from a non-reducible chemical species by the one or more molten alkali metal reductants. The method also comprises removing the reaction products and optionally a non-reducible chemical species from the reactor.

In some embodiments, greater than 99% of the halocarbon is reduced, reacted, or removed from the chemical stream.

In some embodiments, an excess amount of unreacted molten alkali metal reductant remains after the reacting with the oxidant in the chemical stream.

In some embodiments, the reusable reactor is selected from a multiplicity of reactor vessels arranged in series, a reactor with a circulating loop comprising at least some unreacted molten alkali metal reductant, a reactor partitioned into a multiplicity of reaction zones, or combinations thereof.

In some embodiments, the presently disclosed subject matter is directed to a system for reducing, removing, or destroying an oxidant in or from a chemical stream. Particularly, the system comprises a reusable reactor capable of combining a chemical stream and at least one molten alkali metal reductant not dispersed in a carrier, wherein the reductant is heated above its melting point. The system includes a reducing element comprising at least one molten alkali metal reductant not dispersed in a carrier, and an oxidizing element comprising an oxidizable chemical species. The system comprises an optional temperature control device capable of raising, lowering, or maintaining the temperature of the reactor at a temperature above the melting point and below the boiling point of a reducing element. The system optionally includes a non-reducible chemical species.

In some embodiments, the system further comprises at least one of a multiplicity of reactor vessels arranged in series, a reactor with a circulating loop comprising at least some unreacted molten alkali metal reductant, and/or a reactor partitioned into a multiplicity of reaction zones.

In some embodiments, the system further comprises a non-reducible chemical species taken from a nitrogen gas, a noble gas, or a hydrocarbon liquid or gas.

In some embodiments, the oxidant is selected from a halocarbon, a sulfur compound, a nitrogen compound, an oxygen compound, water, carbon monoxide, carbon dioxide, an amine, a nitrogen oxide, oxygen, a cation, a persistent organic pollutant (POP), or combinations thereof.

In some embodiments, the system further comprises at least one of an absorber system, an ion exchange system, or a reverse osmosis system optionally placed upstream of the system.

DETAILED DESCRIPTION

Figure 1:
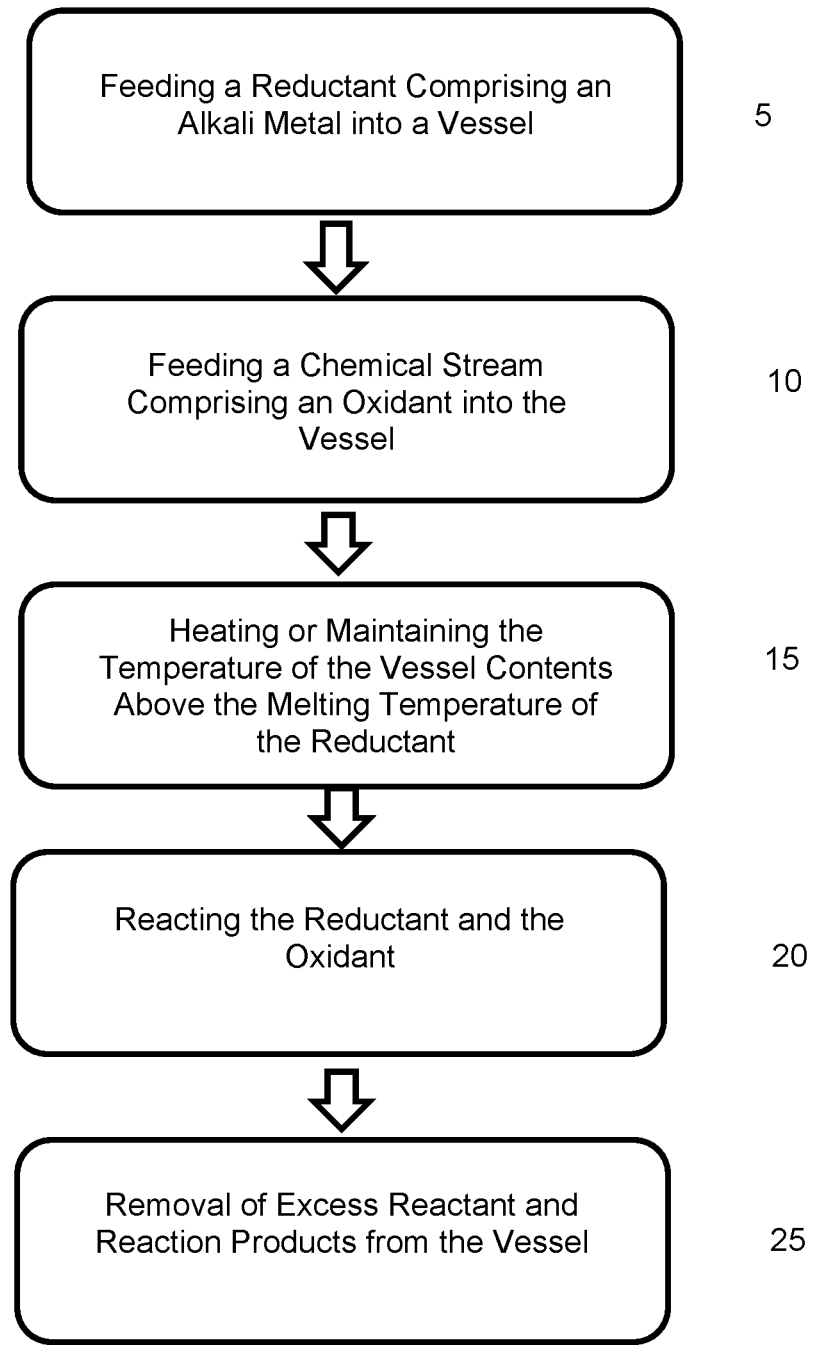
FIG. 1 is a schematic illustrating one method of reacting, removing, and/or reducing an oxidant from a chemical stream in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is generally directed to a system and method of reducing, reacting, and/or removing a chemical or an unwanted chemical species ("an oxidant") from a chemical stream using a molten alkali metal ("a reductant"). The term "reducing" refers to decreasing the oxidation state or valence state of a chemical or positive ion or element. The term "reductant" refers to a chemical or element that gives up electrons in a chemical reaction, defined herein as a molten alkali metal. The term "oxidant" refers to a chemical or ion or element that accepts electrons in a chemical reaction. The term "reacting" refers to having a chemical reaction between an oxidant and a reductant. The term "removing" refers to a process of purging an oxidant from a chemical stream. The term "non-reducible" refers to a chemical species that is not reduced when contacted with the reductant.

Particularly, the disclosed system and method include the use of one or more reductants (e.g., sodium metal) that react with an oxidant in a chemical stream. The reductant and the chemical stream with an oxidant are added to a reactor and allowed to react for a desired amount of time. The reductant will reduce, react with, and/or remove the oxidant from the chemical stream. Excess reductant and non-reducible chemicals if present and reaction products are then removed from the reactor, as described in more detail herein below.

FIG. 1 illustrates one method of reacting, removing, and/or reducing an oxidant chemical species from a chemical stream. Particularly, at steps 5 and 10, a reductant and a chemical stream comprising the oxidant are fed into a reactor. The term "reductant" as used herein refers to one or more reactive metals capable of donating electrons to an oxidant. Although sodium is frequently mentioned in the description herein due to its low cost, low melting point, and high reactivity, it should be appreciated that the reductant is not limited. For example, the reductant can be selected from one or more alkali metals selected from the Group 1 metals of the periodic table and include lithium, sodium, potassium, rubidium, cesium, francium, or combinations thereof.

In some embodiments, a single reductant can be used, such as (but not limited to) sodium. In other embodiments, more than one reductant can be used.

The reductants as disclosed herein are in a liquid state. The term "liquid state" refers to a physical state wherein at least a portion (e.g., at least about 50, 60, 70, 80, 90, 99, 99.9, 100 percent) of the reductant is liquid.

In some embodiments, the reductant can be added to the chemical stream in excess. The phrase "in excess" refers to quantities such that there is an excess of reductant such that if all of the oxidant chemical species fed to the reactor were reacted with the quantity of reductant fed to the reactor, there would be additional unreacted reductant left over. In some embodiments, the ratio of reductant to oxidant is about 1:1, 2:1, 3:1, 4:1, 5:1, 6:1, 7:1, 8:1, 9:1, 10:1 or more.

The chemical stream comprises at least one oxidant. The term "oxidant" can include a wide variety of species that react with, are reduced by, or are removed by the reductant, such as (but not limited to) one or more of a halocarbon, a sulfur compound, a nitrogen compound, an oxygen compound, $CO_2$, $CO$, $H_2O$, a metal ion, an amine, a nitrogen oxide, a cation, oxygen, and other reducible species. The term sulfur compound means an organic or carbon-comprising molecule or substance that comprises a carbon-sulfur bond or any molecule that comprises a sulfur atom. The term nitrogen compound means an organic or carbon-comprising molecule or substance that comprises a carbon-nitrogen bond or any molecule that comprises a nitrogen atom other than $N_2$. The term oxygen compound means an organic or carbon-comprising molecule or substance that comprises a carbon-oxygen bond or any molecule that comprises an oxygen atom. The presently disclosed subject matter also provides a method and system for reacting or removing dissolved, dispersed, entrained, or otherwise suspended ionic metals or metal cations or cations from chemical streams, including from hydrocarbon streams.

Halocarbons are chemical species in which one or more carbon atoms are linked by covalent bonds to one or more halogen atoms (fluorine, chlorine, bromine, or iodine). Suitable halocarbons can include but are not limited to haloalkanes (compounds with carbon atoms linked by single bonds), haloalkenes (compounds with one or more double bonds between carbon atoms), haloaromatics (compounds with carbon atoms linked in one or more aromatic rings), and halocarbons where at least one halogen atom is linked by a covalent bond to a single carbon atom. In some embodiments, the halocarbon species can be selected from the group comprising POPs. POPs (Persistent Organic Pollutants) are organic compounds comprising halogen-carbon bonds that are resistant to environmental degradation through chemical, biological, and photolytic processes. POPs suitable for use with the disclosed system and method can include (but are not limited to) aldrin, chlordane, dieldrin, endrin, heptachlor, hexachlorobenzene (HCB), mirex, toxaphene, polychlorinated biphenyls (PCBs), dichlorodiphenyltrichloroethane (DDT), dioxins, polychlorinated dibenzofurans, chlordecone, lindane, tetrabromodiphenyl ether, pentachlorobenzene (PeCB), PFAS (poly and perfluoroalkyl substances), and endosulfans. The entire Stockholm Convention list of POPs is incorporated by reference herein.

It will be evident to those skilled in the art that some halocarbons comprise a significant weight fraction of halogen atoms, and others have comparatively less weight fraction halogen atoms. The presently disclosed subject matter is effective for the reduction and breaking of the carbon-halogen bond irrespective of how many carbon-halogen bonds on the molecule there may be. For example, vinyl fluoride is a commercially valuable monomer with two carbon atoms and one fluorine atom. The presently disclosed subject matter for example will be effective for the abstraction of the single fluorine atom from a vinyl fluoride molecule or a fluoromethane molecule and will be effective for the abstraction of all four fluorine atoms from carbon tetrafluoride ($CF_4$) molecule or tetrafluoroethylene (TFE) or other molecules or chemical species with multiple halogen atoms on the molecule.

The oxidant can include any of a wide variety of metals or metalloids that are in an oxidized state or metal cations or cations. Examples of cations or metals in an oxidized state or metal cations include $Fe^{2+}$ and $Fe^{3+}$, $Cu^{2+}$, $Zn^{2+}$, $Ni^{2+}$, $Mn^{7+}$, $Cr^{3+}$, $Co^{2+}$ and $Co^{3+}$, $Mg^{2+}$, $Ca^{2+}$, $V^{4+}$, $Al^{3+}$, $Ag^+$, etc., and many other examples could be listed. Non-metallic cations are also considered cations for the purposes of this invention.

Water in a liquid or vapor form or moisture is also an oxidant for the purposes of this invention and will react with and will be reduced by the reductants of the present invention.

Hydrocarbons are one example of a non-reducible species as disclosed herein. The term "hydrocarbon" refers to compounds comprising only hydrogen and carbon. Suitable hydrocarbons can include saturated hydrocarbons, unsaturated hydrocarbons, and aromatic hydrocarbons. Particularly, the non-reducible species will not react with the reductant. Other non-reducible species include nitrogen and noble gases.

The reductant can be added to water-comprising or non-aqueous chemical streams to destroy, react, or remove the oxidant species present in the stream. The term "non-aqueous" refers to chemical streams wherein water is not a major component of the chemical stream (e.g., gaseous nitrogen streams comprising entrained or vaporized POPs) or hydrocarbon oils. Further, the chemical stream can be in solid, liquid, or gas phase. In some embodiments, a combination of these can be used.

Figure 2A:
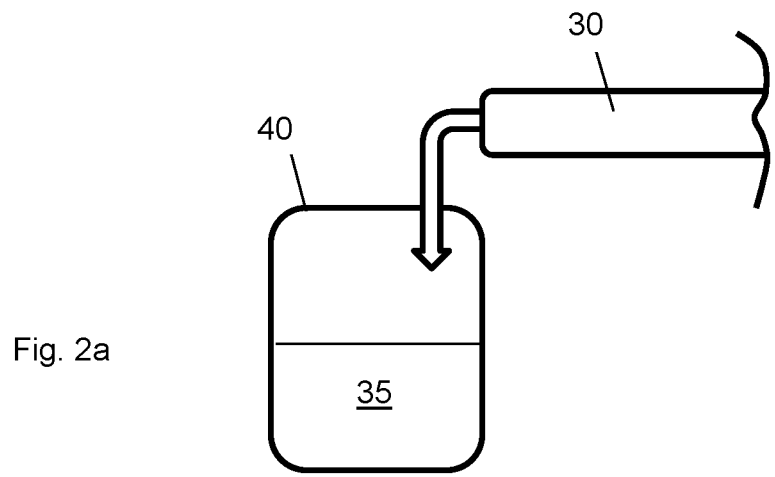
FIGS. 2a-2c are fragmentary front plan views of the addition of reductant and/or a chemical stream into a reactor in accordance with some embodiments of the presently disclosed subject matter.
Figure 2B:
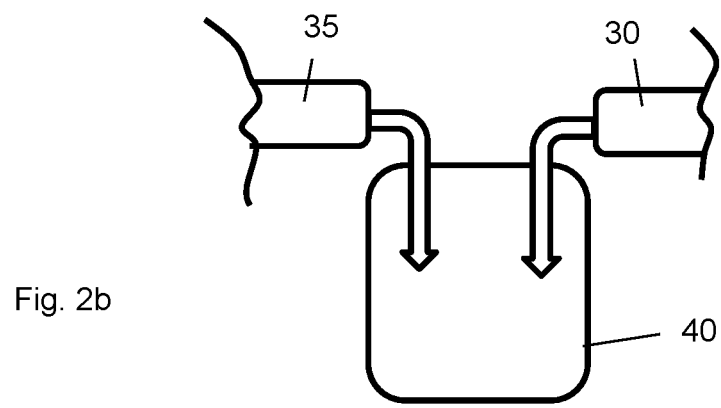
Figure 2C:
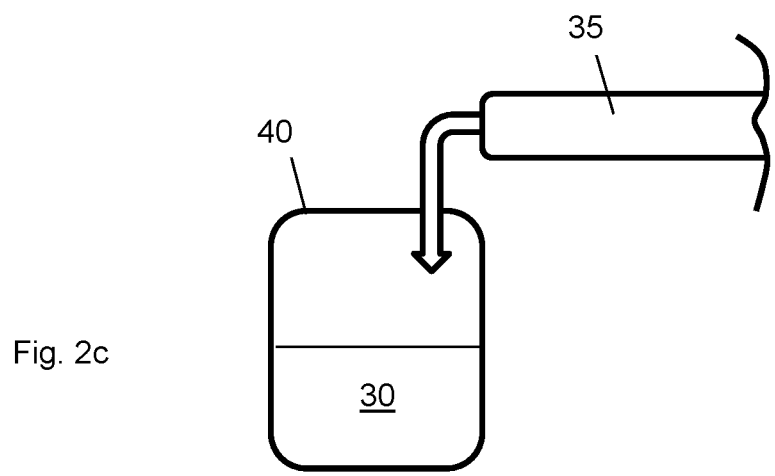

It should be appreciated that the order of addition of the streams to the reactor is not limited. For example, FIG. 2a illustrates one embodiment of feeding reductant 30 into a reactor comprising chemical stream 35. It should be appreciated that the presently disclosed subject matter also includes embodiments wherein the reductant and chemical stream are simultaneously added to reactor 40, as shown in FIG. 2b. In other embodiments, the chemical stream is fed into a reactor comprising reductant 30, as shown in FIG. 2c.

The term "reactor" as used herein broadly refers to any container or vessel within which a chemical reaction can occur. For example, any type of pipe or reactor that is capable of bringing two chemical streams of the present invention, including a reductant and an oxidant, together and providing a mechanism for one stream to contact another stream can be used. Suitable reactors can include (but are not limited to) CSTR (continuous stirred tank reactors), batch tank reactors, plug flow or pipe reactors, recirculating loop plug flow reactors, packed column reactors, tray tower reactors, spray tower reactors, and any other reactor design in which liquid-liquid contact and/or liquid-gas contact and/or liquid-solid contact can be performed. A reactor includes for the purposes of this invention any part of the equipment where a reductant and an oxidant are brought together. Thus, if a molten reductant is combined with an oxidant in a device or a section of piping upstream of a vessel where the majority of the reaction may take place, the piping or device where the reductant and oxidant are combined or allowed to react is included as part of what is meant herein as "a reactor" or "the reactor." Similarly, if the reaction may be still occurring in piping on the discharge of a vessel, the piping in which the reaction may be still occurring is also considered part of the definition of "a reactor" of the present system and method.

The disclosed system can include a single reactor or a series of reactors.

Particularly, a series of reactors may be beneficial when complete destruction of the oxidant is desired or where it is difficult to achieve complete destruction in a single stage, zone, or reactor.

In one embodiment, the system and method of the present invention is arranged so that the feed to the reactor comprising an oxidant comes from a regeneration stream from an absorber such as a granular activated carbon absorber. For example, an activated carbon absorber can be used to scrub organic oxidants such as PFAS or halocarbon compounds out of an air stream, the air stream being in some situations the exhaust air from a building in which PFAS compounds or halocarbons are processed. In such situations, fugitive halocarbon emissions from the vessels in the building enter the air, and it is desired to not emit these emissions into the environment outdoors, so the building exhaust air is passed through a carbon bed. When the carbon bed has reached capacity and cannot hold more halocarbons, in situations where the bed and carbon in the bed is designed for a regeneration cycle, the bed is taken off line and heated or optionally passing steam or hot nitrogen through the bed to desorb the halocarbons on the carbon surface. The system and method of the present invention can be situated so as to receive this regeneration stream and desorbed halocarbons, effecting complete destruction, if desired, of the halocarbons. The benefits of such a tandem arrangement of a carbon bed absorbing a halocarbon or other oxidant out of a high volume air stream and the reactor of the present invention being used to destroy the desorbed halocarbon or oxidant from the regeneration cycle becomes apparent when realizing that if the building air were fed directly to the present invention for the removal and destruction of the halocarbon from the air, which it would be able to do, much more reductant would have to be used because all of the moisture in the air and possibly the oxygen in the air will also react with the reductant, consuming the reductant and driving the operating costs of the present invention much higher. By using the activated carbon as a first step, the halocarbon or oxidant is selectively removed from the high volume air stream with the oxygen and moisture in the air passing through mostly unabsorbed on the carbon absorbent, and thus the carbon absorbent acts as a concentrator of the halocarbon or oxidant and allows for a much more concentrated halocarbon or oxidant stream to be produced in the regeneration cycle, preferably without the use of air or significant moisture to desorb the halocarbon or oxidant, thus making the overall costs of the reaction with the oxidant in the present invention much more economical. This tandem arrangement of using an absorbing unit upstream of the present invention to remove a halocarbon or an oxidant from a first chemical stream, then in a regeneration cycle of the absorbent feeding a desorbed halocarbon or oxidant as a second stream to a reactor comprising a reductant of the present invention, this tandem arrangement is also a system and method of the present invention.

Similarly to the embodiment described above where an activated carbon absorber is used upstream of the reactor with molten alkali reductant of the present invention to treat or remove oxidants from air or gas streams, an activated carbon absorber can be used upstream of the reactor to treat aqueous streams, with the desorbed regeneration stream being sent to the reactor with the molten alkali metal to destroy the oxidants. For example, a granular activated carbon system can be used in a water treatment facility to remove PFAS halocarbons from the water supply. When the activated carbon is sufficiently laden with PFAS, the absorber can be switched off-line and a regeneration cycle established to desorb the PFAS from the activated carbon to create a stream with a higher concentration of PFAS than the feed water to the absorbers. This regeneration stream can then be sent to the reactor of the present invention. Similarly, water may be treated with an ion exchange resin or a reverse osmosis system or other water treatment system or method or combination of methods for removing halocarbons from a water stream, and the discharge from any of these water treatment systems, which may contain a higher concentration of halocarbon than the concentration of halocarbon in the water source going into the water treatment system, may be fed as a chemical stream containing an oxidant to a reactor of the present invention to reduce the halocarbon, along with any water present, using molten alkali metal. This combination of a water treatment system to remove the halocarbon from for example a drinking water stream followed by a reductive destruction of the halocarbon once it has been desorbed or expelled from the water treatment system using molten reductant in a reactor of the present invention is also a preferred embodiment and a system and method of the present invention. This combination of systems may be further improved by the addition of a water removal step in between an absorber, an ion exchange resin, a reverse osmosis, or other air or water treatment system for removing a halocarbon or oxidant from an air or water stream, said water removal step comprising a zeolite, or a membrane, a distillation tower, or other technology known in the art for removing water from a chemical stream, or a combination of water removal steps. The addition of a water removal step will decrease the load on the alkali metal reactor and decrease the amount of alkali metal reductant being consumed.

In some embodiments, the reactor is a closed reactor. The term "closed reactor" refers to a reactor that is not substantially open to the atmosphere, meaning air from the environment surrounding the equipment (such as building air or outdoor air if the equipment is located outdoors) is not substantially allowed to enter the rector. "Substantially" indicates that there is no significant opening for gas or liquids from the air to introduce a substantial amount of air or moisture into the reactor. In some embodiments, the closed reactor can house gases fed to the reactor such that the desired reaction is achieved prior to releasing gases out of the reactor or series of reactors. In some embodiments, a closed reactor can include a reactor that may discharge its gaseous or liquid contents to the atmosphere but the air in the atmosphere is not allowed into the reactor under normal operating conditions.

The flow of reductant and chemical streams into and out of the reactor can be controlled by any method known in the art, such as transferring material through piping by pumping, by pressurizing a chemical stream in a feed vessel and transferring the stream to the reactor by pressure, by gravity transfer, by siphoning, and the like.

One technology provided herein is a method and system for controlling the flow of gas and liquid through the reactor to ensure thorough contact of the chemical stream with the reductant prior to allowing the gas and liquids to exit the reactor. This is especially true in situations where gaseous pollutants such as halocarbons are being treated and essentially 100% destruction of the halocarbon is desired. In these embodiments, the elevated temperatures of the disclosed system and method will cause many halocarbons to vaporize, and some may vaporize suddenly when heated. As the reaction with the reductant proceeds, heat of reaction may act on the vaporized feed to cause expansion and pressure build up. If moisture is also present in the feed stream, it may react violently with the reductant, and along with the released heat of reaction, the unreacted water vapor and gaseous products of reaction, along with the gaseous unreacted halocarbon, may result in very rapid gas expansion and the potential for a rapid rise in pressure in the reactor vessel. This rapid expansion and pressurization of gases present may result in unreacted gases being pushed out of the reactor before adequate contacting with the reductant is achieved, and thus oxidant may exit the reactor without being reduced by the reductant.

Because of these processing challenges, provision must be made, as provided in this invention, for constraining the gases and preventing them from blowing through the reactor unreacted. One method of restricting the flow of gas phase reductants through a reactor and preventing them from prematurely exiting is through the use of partitioned or staged reactions. Particularly, the reactor can comprise a plurality of stages or zones that are separated by physical elements that act as restrictions to the flow of gas or material from one zone to another. The zones can be created using any method, such as (but not limited to) restricting orifices, such as can be inserted in a pipe reactor to prevent the gas from rapidly moving through the reactor to the exit nozzles. In a larger diameter reactor, the physical stages can be produced by trays or physical barriers that can include perforations, channels, holes, and/or openings of any shape or size that serve to control the flow of gas or liquid within the reaction chamber. It will be obvious to those skilled in the art that these restrictions will create a back pressure and pressure drop as material moves through the reactor, with the higher pressures in the areas where the reactants and non-reducible species are fed into the reactor, and the lower pressures being in the zones after these initial feed zones. The internal structures of the reactor and zones in the reactor can be constructed to force liquid and gas contact to assist the reaction.

In some embodiments, the reactor can include multiple reactors or multiple reactors operated at different pressures. For example, a first reactor can be configured at a first pressure designed to achieve a portion of the contacting of the chemical stream and reductant. The first reactor can feed into a second reactor at a higher, equal, or lower pressure compared to the first reactor, where the reaction is continued or completed. It should be appreciated that any number of reactors can be used, such as 1, 2, 3, 4, 5, or more. The reactors can be arranged in series or parallel or a combination of series and parallel. Arranging the reactors in series for example, and arranging the flow of gas such that the gas has to come into intimate contact with the liquid reductant prior to moving from one reactor to the next reactor in series is one way of ensuring that gaseous oxidants are not able to move through the reactors without coming into intimate contact with the liquid reductant for the required amount of time.

Figure 3A:
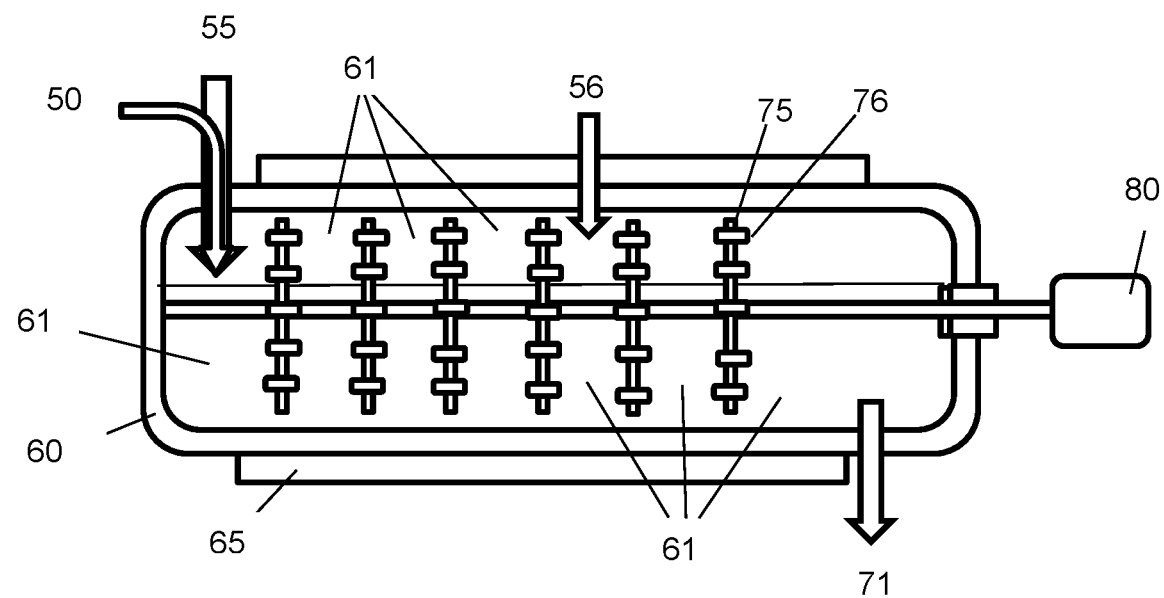
FIG. 3a is a side plan view of a reactor in accordance with some embodiments of the presently disclosed subject matter.

FIG. 3a illustrates one embodiment of a single reactor 60 that can comprise more than one zone. For example, the different zones in a reactor can be created by a dynamic mixing device. Any mixing device can be used, such as (but not limited to) a rotating disk, agitator, or an attachment to a shaft inserted into the reactor. The attachment blocks some (but not all) of the cross-sectional area of the reactor diameter. A force external to the reactor acting on the shaft and attachments to the shaft can provide the rotational movement. In one embodiment, a first reaction zone in a reactor is separated from a second reaction zone by a disk attached to a rotating shaft, wherein the disk covers at least 20% of the cross sectional area of the reactor diameter at the position where the disk is mounted.

As shown, feed stream 50 (e.g., a halocarbon feed stream) enters the reactor along with the excess reductant fresh feed or recirculation stream comprising reductant 55. The system can also include optional fresh reductant feed located at any desired entry port 56. Internally, the reactor includes multiple zones 61 to help prevent gases and liquids from passing through without adequate reductant contact or residence time, with said zones being created by attachments to the rotating shaft. These zones may alternatively be created by providing attachments to the internal surfaces of the reactor. The reactor can include heater 65 to elevate or maintain the temperature within the reactor to a desired level, which may include an electric heater or a shell around the reactor through which heating fluid is passed. Heater 65 may in some embodiments be a shell around the reactor in which cooling fluid is passed to cool the reactor. In some embodiments, the heater can be configured about the external surface of the reactor, although any heating element can be used.

It should be appreciated that the application of heat increases reaction rate within the reactor. In some embodiments, the temperature within the reactor can be controlled at a temperature that is closed to, at, or exceeding the auto-decomposition temperature for a particular chemical species. For example, when the undesired chemical species is a halogen, exceeding the auto-decomposition temperature provides a second mechanism of halogen deconstruction in addition to reduction. For example, when it is desired to destroy or remove halocarbons from chemical streams, the temperature can be increased to near or above the auto-decomposition of the halocarbon oxidant (e.g., in the range of 200° C. to 600° C. in the case of halocarbons).

Effluent 70 (e.g., excess reductant, salts, carbon particles, metal hydroxides, non-reducible chemical species, and inert materials) with lowered or no oxidant levels exits the reactor. In some embodiments, during operation of the reactor, an excess of reductant (e.g., reduced metal in a liquid form) is maintained above and beyond that needed to react with all the oxidizable constituents of the stream (e.g., halocarbon, POP, or PFAS waste streams) being fed to the reactor.

The reactor can include one or more internal attachments 75 to create different reaction zones 61 in the reactor. As described previously, these attachments can be designed to restrict the flow of gas and liquids from one zone to another to help ensure adequate residence time in each zone of the gas and liquid. To enhance liquid and gas mixing and particle size reduction, the attachments 75 can have any desired size and/or shape. For example, the attachment may be a disk that may have the same or similar cross-sectional shape when compared to the reactor. Each attachment can include one or more extensions 76 further comprising fins or paddles or vanes or shapes to facilitate efficient mixing in each zone or to help control liquid and gas flow from one zone to another. In some embodiments, each attachment with extensions within the reactor moves in the same direction and/or at the same rate because they are attached to the same rotating shaft. Alternatively, each extension can move in an opposite or different direction and/or speed when compared to at least one other attachment (e.g., counter-clockwise/clockwise directions). Alternatively, attachments with or without extensions can be mounted on the inside of the vessel wall, or attachments with or without extensions may be mounted on the rotating shaft and attached to the inside wall, creating a rotor-stator arrangement. Any element can be used to rotate the shaft and attachments 75, such as (but not limited to) motor 80. Similarly, each disk or attachment can move in the same direction/speed or in opposite directions and differing speeds compared to at least one other attachment or extension.

In some embodiments, the attachments and/or disks are designed so that there is a clearance between the outer edges and the inside wall of the reactor. The clearance is the area through which reductants will pass in these embodiments. Adding serrated edges or teeth 85 to the outer edges of the attachment or disk can aid in mixing and size reduction if solids are present. In some embodiments, the extensions can push the chemical stream and reductant backwards, towards the feed ports where the chemical stream was fed to the reactor, to assist in vigorous mixing and to hinder the forward passage of gases from one zone to the next. By attaching attachment 75 (and/or one or more disks, agitators, and/or other physical objects) to a rotating shaft, different zones 61 are created to hinder the ability of gas to pass rapidly through the reactor without adequately contacting the reductant. The number of zones created is not limited.

Figure 3B:
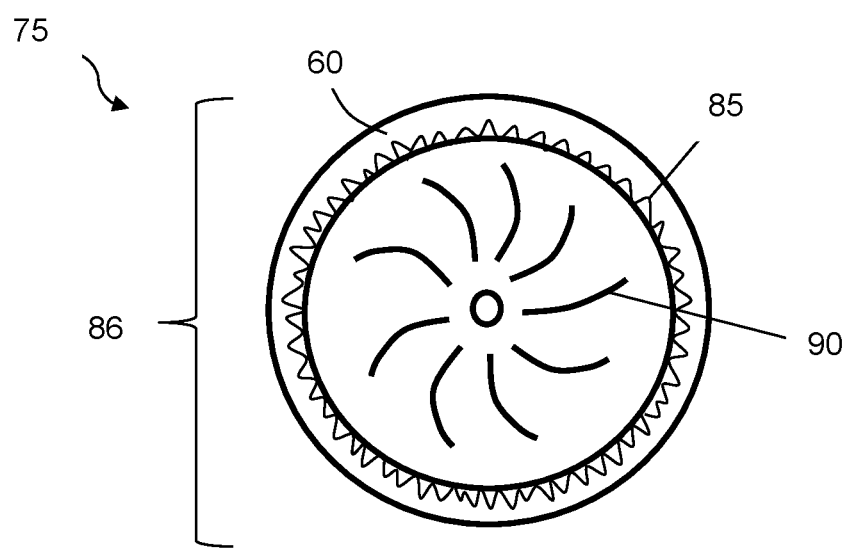
FIG. 3b is a top plan view of a reactor extension and arm in accordance with some embodiments of the presently disclosed subject matter.

FIG. 3b is a side plan view of one embodiment of a reactor with dynamic mixing zones with a disk-shaped attachment separating the zones. Particularly, one or more attachments can include a toothed edge 85 (e.g., at least one sharp, rough, and/or pointed edge) to enhance mixing and to reduce the size of any contacted particles. In some embodiments, the toothed edge can be a disk edge. Each attachment or extension or arm can further include one or more apertures 90 that help distribute the reductant into the chemical stream. In some embodiments, the apertures can be configured as holes, slits, ports, or any other openings. It should be appreciated that toothed edge 85 and aperture 90 are optional features.

The reactor 60 of FIGS. 3a and 3b therefore facilitate excellent mixing of gases, solids, and/or liquids to ensure complete reaction of the oxidant. There are three possible ways in which the oxidant can get through the excess liquid metal reactor without coming into adequate contact with the reductant and thus pass through without being destroyed. First, gas entrainment can occur (e.g., quickly blowing through the reaction zone as a gas without adequate mixing and residence time in contact with the liquid reductant). Second, the presence of solid particulates in which, potentially, a carbon or other solid crust can form around the oxidant, preventing the reductant from contacting the oxidant and reacting with it. For example, a halocarbon or other unwanted chemical species embedded in a particle may be carried through the reactor unreacted. Third, two phases of liquids (e.g., a hydroxide phase and a liquid metal phase or a liquid reductant phase and a hydrocarbon phase) can be present, where the oxidant absorbed in the liquid phase other than the reductant phase is carried through the reactor without seeing intimate contact with the liquid reductant phase.

The disclosed reactor can provide excellent mixing as well as obstructions that create separate reaction zones to prevent the blowing through of gases and solids. The serrated edges of edges 85 break apart solids into smaller particles, thus helping to prevent the encrustation as discussed above. In some embodiments, the attachments and/or extensions span almost the edges of at least one reactor wall to prevent gases from blowing through the reactor. In some embodiments, a first reaction zone in a reactor is separated from a second reaction zone by disk 75 attached to a rotating shaft, or alternatively a disk attached to the inner walls of the reactor, wherein the disk covers at least 95%, 90%, 85%, 80%, 75%, 70%, 65%, 60%, 55%, 50%, 45%, 40%, 35%, 30%, 25%, or 20% of the cross-sectional area of the reactor diameter 86 at the position where the disk is mounted.

In some embodiments, a reactor 60 with multiple internal zones may be oriented in a horizontal direction to allow the rotating internal extensions and arms to sweep into the excess reductant and slosh the reductant as droplets into the gas phase. Those skilled in the art of mixing and design internals will recognize that there are many different variations of this basic concept that can be employed to ensure very good mixing of all phases in each of the compartments. The shaft can be supported on either end with carbon or other bearings of suitable materials. On the end of the shaft that penetrates the reactor wall to be attached to the motor, a carbon packing gland, mechanical seal, double seal, etc. can be used, to prevent the leakage of reductants into the environment. Nitrogen can be bled between a double seal to allow nitrogen to bleed into the process, thus helping to prevent escape of chemicals.

In some embodiments, the reactor is reusable (e.g., capable of being reused multiple times for the same or different reactions).

In some embodiments, the reactor gaskets and seals lack fluoropolymer.

Particularly, fluoropolymer can be attacked and decomposed as a result of contact with the reductant (e.g., molten metal).

In some embodiments, one or more internal reactor bearings can include a metal shaft resting in a cylindrical well, socket, hole, indentation, or other raised holder constructed in a part of the reactor wall to support one end of a rotating shaft. The lubrication of the rotating shaft can be provided by the reductant or chemical streams. In other embodiments, it may be desirable to fit a bearing made of carbon or other material capable of withstanding high temperatures, a strong reducing environment, and attack from the reductants, oxidants, and other chemicals being fed or formed inside the reactor. In still other embodiments, steel ball bearings held in a raceway can be used to support the shaft and provide a bearing in or on which the shaft may be supported and turn freely. The use of ball bearings can also assist with mixing and reducing the size of any particles that are formed.

In some embodiments, multiple ball bearing raceways may be incorporated in or on the disk that separates different zones of the reactor, with the fluids needing to pass in part through rotating ball bearings to proceed to the next zone. Such a design allows for the simultaneous supporting of the shaft, mixing of reductants, separating the zones, and reducing the size of any solid particles that are formed.

Seals between the rotating shaft and the outside of the reactor are provided in this invention and can be selected from those known in the art to be suitable for high temperatures and a strongly reducing environment.

In some embodiments, the presently disclosed subject matter employs an excess liquid metal reactor design with a recirculating loop of a stream that comprises an excess of liquid metal (passed through piping), into which the halocarbon or other chemical stream comprising an oxidant is introduced in a mixing zone at a rate so as to not consume all of the reactive metal in the recirculation loop. The combination of excess reactive metal and oxidant inside a pipe in such a configuration is in essence a plug flow reactor until the loop terminates by discharging in a collection reactor. This is advantageous in that while the two streams are in intimate contact in the piping loop, the gases are prevented from escaping without reacting with the reductants and various things can be done to ensure intimate contacting and completion of the reaction.

Figure 4A:
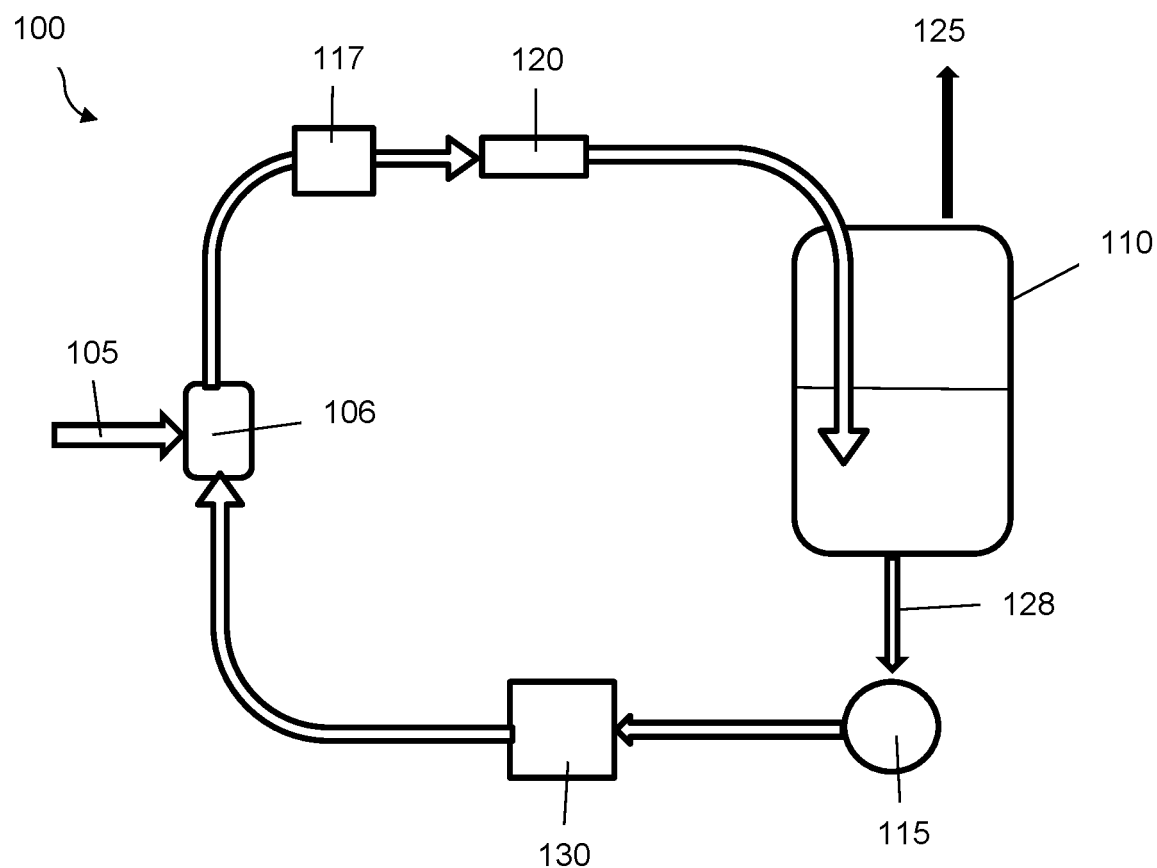
FIG. 4a is a closed loop reactor in accordance with some embodiments of the presently disclosed subject matter.

FIG. 4a illustrates one embodiment of a recirculation loop plug flow reactor in accordance with some embodiments of the presently disclosed subject matter. As illustrated, reactor loop 100 includes feed 105 through which the chemical stream comprising one or more oxidants and/or reactants are added into the system in a fluid mixing chamber 106. In some embodiments, the stream comprises waste halocarbon gas or liquid. Feed 105 is mixed with recirculated reductant, etc. 129 in mixing chamber 106 and circulated through the loop into disengaging tank 110 using pump 115. Any type of suitable pump can be used, but due to the difficulty of pumping liquid metals, using an electromagnetic pump for example of the type made by Creative Engineers, New Freedom, Pa. may be preferred.

In some embodiments, the loop can include one or more heaters 117 to heat the contents in the piping to a desired temperature. In some embodiments, the loop can include one or more mixers 120 that mix the reductant with the chemical stream. In some embodiments, mixer 120 comprises a static mixer to accommodate a comparatively large volume. Alternatively, in some embodiments, the mixer can be configured as a dynamic mixer.

The reactor can include vent 125 off of the disengaging tank 110 to allow one or more gases to be discharged from the reactor and system. In some embodiments, the gases can be oxidant-free (e.g., halocarbon-free gases) and may comprise hydrogen, nitrogen, and the like.

Optionally, the disclosed system can include one or more filters 130 to remove large and/or solid particulates. Any suitable filter can be used, such as a sintered metal filter (e.g. a stainless steel screen), a sintered or fibrous glass filter, ceramic filters, polymeric filters, or combinations thereof.

Particularly, the disclosed recirculation loop design of FIG. 4a can be used to remove one or more halocarbons from a chemical stream. The system consumes halocarbons and water rapidly and completely at temperatures of greater than 350° C. Additional in line mixing, residence time, and heating as needed to accomplish complete halocarbon destruction can also be provided by the system. Halocarbon-free gases are vented from the reactor system (e.g., hydrogen, nitrogen). Complete destruction of halocarbon is achieved.

The disclosed loop 100 allows independent design/control of residence time, temperature, and excess reductant (e.g., sodium). For example, the piping loop can be designed to provide a 4-hour residence time at 600° C. with 50% excess of sodium (all in low pressure stainless steel piping).

Figure 4B:
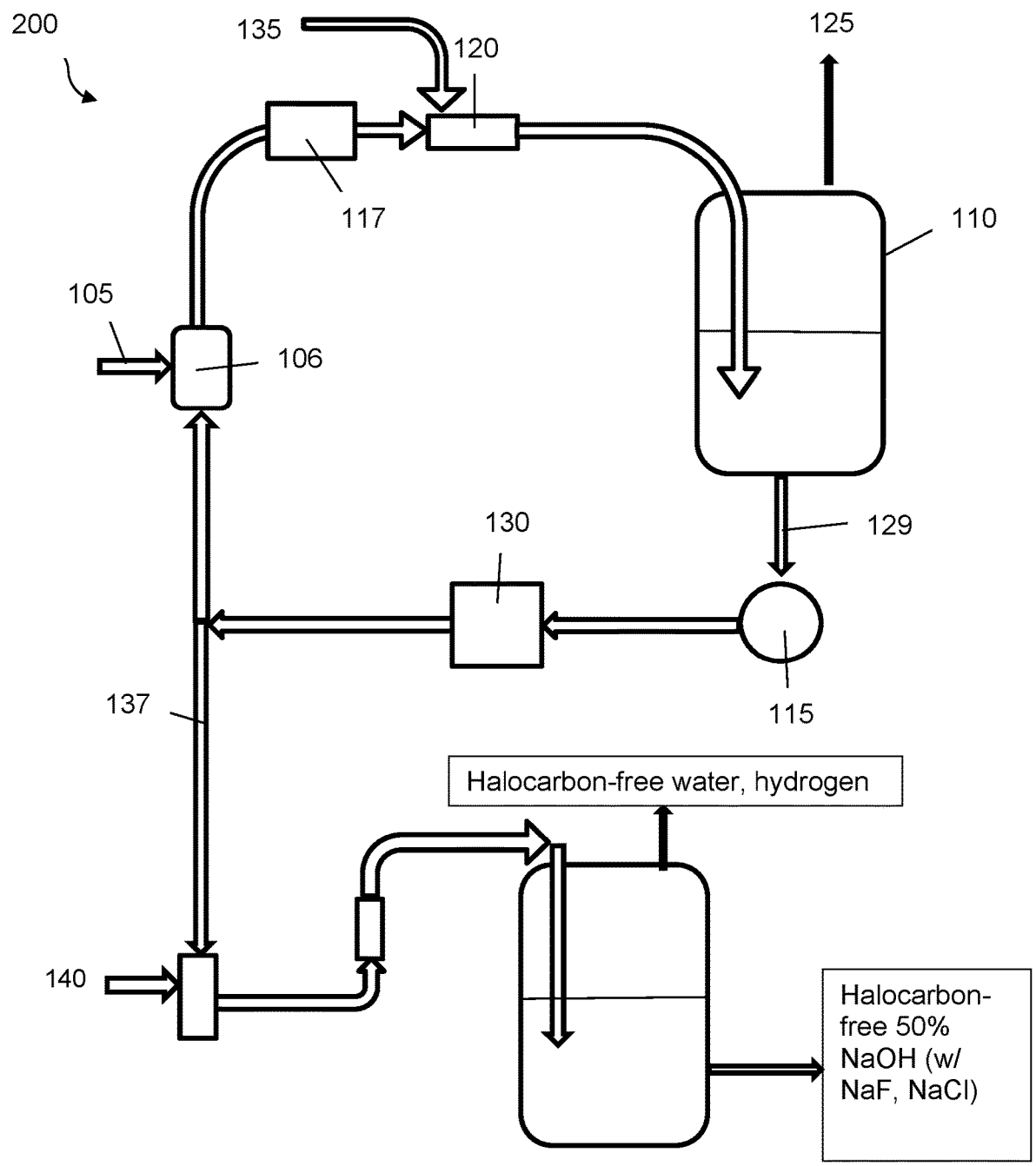
FIG. 4b is a two-phase closed loop reactor in accordance with some embodiments of the presently disclosed subject matter.

FIG. 4b illustrates a reactor loop 200 comprising first and second stages. As shown, in the first stage a chemical stream and reductant are circulated through the loop, venting one or more gases as described in FIG. 4a. In some embodiments, the loop can include fresh reductant (e.g., Na°) feed 135. In the second stage, the resultant products of reaction and excess reactive metal from the first stage 137 are reacted with excess water or steam 140 to completely react the excess reactive metal and form an essentially halocarbon-free metal hydroxide liquid or solid of desired water concentration.

Residence time can be increased if needed by extending the length or increasing the diameter of the piping. Mixing of the streams can be facilitated by installing internal baffles or other static mixing elements that create internal turbulence. Tortuosity can be added to the piping by adding bends and manipulating vertical and horizontal orientation of the flow through the piping. Heaters can be added to sections of piping which create higher temperature zones which will speed up the reaction if needed. The excess liquid metal reactor is especially suitable for heating because hundreds of degrees of additional temperature can be achieved without increasing the internal pressure significantly (sodium for example melts at about 100° C. and boils over 800° C.). Thus, a significant increase in temperature can be applied, and therefore much greater reaction rates can be achieved, without increasing the internal pressure of the fluid significantly.

If an excess of reactive metal is not maintained, the internal pressures may be significantly higher depending on the vapor pressure of the constituents. Fresh molten alkali metal feed can be fed to any reaction zone to further ensure complete reaction of the waste or feed stream. Once the reaction has been brought to completion, the contents of the recirculation loop can be deposited in a separation vessel 110 where halogen-free gases ($N_2$, $H_2$, and other gases) are released and vented and the remaining unreacted metal and by products of the reaction (e.g. NaOH, NaF, carbon particulates, etc.) are collected. The discharge of this disengaging/separation vessel can then be pumped through the loop again 129, if desired, the solids filtered out 130, a purge stream removed 137 (in the continuous operation configuration), with the remaining bulk stream being passed into the mixing zone.

The presently disclosed subject matter also includes a design wherein fresh liquid reactive metal is mixed with the waste (or other) stream to be treated, gas or liquid, in a co-current flow design (no recirculation of liquid as described in the recirculating liquid design). The amount of reactive metal added is in excess of the oxidants in the waste (or other feed) stream to be treated. Many different equipment and piping configurations can be described, usually with the common element that by the time the stream comprising an oxidant and the added reductant has passed through the reaction zone, the vast majority of reaction has occurred (e.g. the vast majority of the oxidant has been reduced), and at that point there still remains an excess of unreacted metal.

Reactor 40 and the lines going to and from the reactor can be constructed from any suitable material, such as (but not limited to) metal. For example, in some embodiments, the reactor can be constructed from stainless steel or steel alloys, such as Hastelloy® or Monel alloys. Hastelloy is an austenitic nickel-based alloy comprising nickel, chromium, and iron along with small amounts of cobalt, molybdenum, and/or tungsten. Monel is a group of nickel alloys, comprises of nickel (52-67 weight percent), and copper with small amounts of iron, manganese, carbon, and/or silicon. In some embodiments, the reactor excludes glass and/or is not glass-lined.

At step 15 of the disclosed method, the reactor contents are heated to a desired temperature. For example, the reactor can be heated to a temperature above the melting point of the reductant. The term "melting point" refers to the temperature or temperature range at which a solid is converted to a liquid. Thus, the temperature at which the reaction is run can generally be above the melting point of the reductant. For example, when the reductant comprises sodium, the reactor can be operated at any temperature above 97.8° C. In some embodiments, the reactor can be heated to a temperature at about the melting point of the reductant. In other embodiments, the reactor can be heated to a temperature above the melting point of the reductant (e.g., 20° C., 50° C., 100° C., 150° C., 200° C. or more above the melting point of the reductant). In some embodiments, the reductant can remain in a liquid state, thereby making mixing and contacting with the chemical stream simpler and more efficient.

Advantageously, the temperature of the reductant can be increased substantially without increasing the pressure of the reaction to any great extent, which in turns allows for higher reactivity and throughputs without significantly increasing the reactor cost. For example, in the case of sodium, the temperature within the reactor may be increased to 150° C., 200° C., 250° C., 300° C., 350° C., 400° C., 450° C., 500° C., or greater (e.g., up to the boiling point of sodium at 883° C.) before even one atmosphere of pressure is reached. However, it should be appreciated that the pressure of the oxidant or undesired species, the byproducts, and the non-reducible species (if present) can produce a higher pressure in the reactor at the temperature chosen and must be considered in overall reactor temperature and pressure design. For chemical streams that are unable to withstand higher temperatures, Group I metal alloys with lower melting temperatures can be used. For example, when a chemical stream is unable to withstand temperatures over 97.8° C., sodium and potassium alloy (NaK) comprising 40, 45, 50, 55, 60, 65, 70, 75, 80, 85, or 90% potassium by weight and 10, 15, 20, 25, 30, 35, 40, 45, 50, 55, or 60% sodium can be used. In some embodiments, the eutectic mixture can include 77% potassium and 23% sodium and is liquid from −12.6 to 785° C. (9.3 to 1,445.0° F.). Liquid potassium can also be used for temperature sensitive chemical species, which is in a liquid state above 63.5° C.

In some embodiments, the reductant and/or chemical stream can be pre-heated prior to insertion in the reactor. The pre-heating can include heating to a temperature above the melting point of the reductant, or to a temperature less than the melting point of the reductant such that the reactor provides the additional heating.

The reactor can be heated by any known method, such as (but not limited to) the heat of reaction of the reactants, external heating equipment (e.g., an external jacket through which steam, hot oil, or other heat transfer media are passed), and/or the use of an electrical heating apparatus attached to the reactor wall.

In some embodiments, the reaction produces excess heat such that the reaction does not need any external heat to be applied to the reactor to maintain the temperature above the melting temperature of the reductant. Providing no external heating or cooling and letting the heat released by the reaction maintain the temperature of the reactor above the melting temperature of the reductant is included in the definition of providing a means to maintain the temperature above the melting temperature of the reductant. In other cases where the heat of reaction produces more heat than is desired, it may be desirable to cool the reactor using standard techniques. For example, cooler fluid (e.g., water, oil) can be circulated through a jacket around the reactor to remove excess heat. In such cases, the provision of a cooling mechanism to remove heat from the reactor can also be used and is considered in the definition of maintaining the temperature of a reactor above the melting temperature of the reductant.

At step 20 of the disclosed method, the reductant and the chemical stream are allowed to react for a desired amount of time. At this step, the reductant reacts with the oxidant in the chemical stream. The reaction time can include (but is not limited to) less than 1 minute, 1-5 minutes, 1-10 minutes, less than 30 minutes, less than 1 hour. In some embodiments, the reaction time can be greater than 1, 2, 3, 4, 5, 6, 7, 8, 9, or 10 hours.

During the reacting step, the reductant can optionally be mixed with the chemical stream using any known static or dynamic mixing element. The term "static mixing element" refers to physical restrictions (e.g., orifices, obstructions, orientation of flow nozzles, trays, "motionless and static mixers" available from companies like Charles Ross and Son Company, and the like) that direct fluid flow with a non-moving part of the reactor or internal structure inserted in the reactor. The term "dynamic mixing agent" refers to a device that promotes mixing, such as (but not limited to) one or more agitators, pumps, paddles, gears, rotating chambers, free floating objects that promote mixing (e.g., steel balls, sand, or other inert material that does not participate in the reaction), and the like. The reactor may comprise a ball mill or media mill type reactor optionally with a rotating vessel that includes for example steel balls inside to provide mixing and pulverizing of any solids in the feed or any solids formed during the reaction. This will assist in mixing the oxidant and reductant and will assist in breaking apart any solids that may hinder the effective contact of a reductant with an oxidant. Many other types of mills are known in the art of reducing the size of solid particles and providing excellent dynamic mixing, especially in the paint industry, and include the aforementioned ball mills and media mills and also include sand mills, high speed dispersers, etc. Examples of the types of enclosed mixing and solid particle size reducing systems that are envisioned to be adaptable as reactors in some embodiments of the present invention include mixing equipment made and sold to the chemical industry by NETZSCH-Feinmahltechnik GmbH, including their "MaxShear" or "Epsilon" in-line dispersers and other mixing equipment. The dynamic mixing device of FIG. 3a, extensions 76 on the attachments 75 mounted on the rotating shaft provide mixing in a forward or backward or other direction. In some embodiments, ultrasound can be used for mixing and breaking up solid particles (e.g., salt, carbon, and the like).

Agitation inside the piping may be accomplished utilizing the pressure produced by vaporizing oxidants, expanding/heating non-reducibles, and the formation of a gas (e.g., hydrogen gas, if moisture is present) to mix the chemical stream and/or reductant.

In some embodiments, the mixing can be accomplished by a magnetic shaped object placed inside the pipe or reactor that is moved by moving magnets or electrical currents outside the pipe or reactor. In this manner, the reactants can be well-mixed and any solids formed may be broken up. A magnetic stirring device is particularly useful in situations where shafts with seals penetrating the vessel walls is undesirable. Mixing and breaking up of solids can prove important in situations wherein the reaction produces a solid crust (e.g., salt or hydroxide) surrounding a droplet comprising unreacted oxidant. In these instances, the unreacted oxidant (e.g., halocarbon) trapped in a particle and inaccessible to additional reductant will decrease the destruction or reaction efficiency of the disclosed method. Similarly, if gases or liquids comprising oxidants such as halogens are introduced into liquid reactive metal, and liquid water is present in the feed, the sudden flashing of water vapor may produce bubbles which in turn may result in the entrainment of halogens which could be carried out of the liquid reactive metal phase prior to complete reaction and complete contact of the halogen with reductant. Therefore, in some embodiments it may be important to maintain thorough mixing of all the gas and liquid phase oxidants to be reacted with the reductant until essentially all of the oxidant has been contacted with the reductant.

In some embodiments, the length of reaction time can be important, as the pressure exerted by the chemical streams at the chosen operating temperature may be higher temporarily until the reaction is completed, after which the pressure may be lower. For example, when anhydrous perfluorinated or perchlorinated halocarbons are fed to the reactor, the reaction byproducts are metal halide salts and carbon particles. The reaction byproducts have extremely low to no vapor pressure, and at the end of the reaction, only the vapor pressure of reductants, likely below 1 atm pressure, are present. However, when operating this process above the melting point of the reductant, feeding the reactor a perfluorinated material can result in a substantial vapor pressure being built up as the halocarbons volatilize, expand, and heat up until the oxidant is fully consumed by the liquid metal. The initial buildup of pressure can cause pressure to build and force the oxidants to pass quickly through the reactor and possibly exit unreacted unless the undesired exit of gases from the reactor is prevented until the entirety of the reaction takes place.

Unreacted reductant and reaction products are then removed from the reactor at step 25 of the disclosed method. In some embodiments, it may be advantageous to remove by-products of the reaction partially or selectively, leaving proportionately more liquid metal behind in the reactor and removing proportionately more reaction byproducts. For example, the purge stream described in the disclosed process can remove unreacted reductant along with the byproducts. However, when reductants such as NaOH and NaF can be removed from the process without removing as much of the unreacted liquid reactive metal, the overall yields of reductant are improved.

In some embodiments, two phases of liquids may form, with one phase being unreacted liquid metal and the other phase being a separate liquid phase, such as liquid NaOH in cases where substantial water is present in the feed and the process is operated above the melting temperature of NaOH. In these instances, it may be possible to selectively remove part or all of the liquid NaOH layer while leaving part or all of the unreacted liquid metal in the reactor or in a subsequent processing step outside of the reactor. This selective removal of by products using two phase liquid-liquid separations may be brought about by simple settling over time in an unmixed zone, or by centrifugation, or by other means. Alternatively, NaOH can be added to the reaction byproducts to force the NaOH, NaF, and other byproducts to form a separate phase which then can be separated from the unreacted reductant. The disclosed method thus allows unreacted reductant to remain in the reactor or be recycled to the reactor to improve yields of the reductant and overall economics of the system. By separating the hydroxide in this manner, the metal halide salts (NaX) can preferentially exit the process through the hydroxide stream. Another means of selectively separating the byproducts to enhance reactive metal yields is to cool the reaction products to precipitate solids. Cooling below 318° C. will precipitate solid sodium hydroxide, and salts may also crystallize out if cooled. Thus, yields of the reductant can be improved by liquid-liquid separation or liquid-solid separation processes.

In some embodiments metallic ions or cations are reduced by the reductant, and the reduced cation may enter the phase comprising the unreacted alkali metal reductant. In such instances it may be desirable to separate out a reduced metal species from an alkali metal reductant. Such a separation may be accomplished by gravity or by the application of centrifugal forces, e.g. by the use of a centrifuge or a device that produces a circular or vortex flow, or by other means known in the art for separating different solids or liquids by density differences. Alternatively, the separation may be facilitated by the application of a magnetic or electric field or current, or by any other method known in the art. To maximize the effectiveness of gravity or centrifugal forces for separating a reduced metal species dispersed in a molten alkali metal reductant, a lower density molten alkali metal reductant may be used. For example, the use of lithium as the molten alkali metal reductant rather than sodium or potassium may allow for a better gravity or centrifugal separation of a higher atomic weight reduced metal dispersed in the molten alkali metal phase from the molten alkali metal phase, due to the greater density difference between lithium and a reduced metal compared to sodium or potassium and a reduced metal. In some embodiments, the reduced metal dispersed in a liquid alkali metal reductant may be filtered out if the reduced metal exists as a solid particle in the liquid alkali metal reductant. In this manner, if the present invention is used to reduce an oxidant comprising an element used in or produced by a nuclear reactor such as uranium or an oxidant that is a rare earth element, the use of potassium as the reductant may be preferred to the use of sodium due to its lower density, or lithium may be preferred as the reductant rather than either sodium or potassium due to the lower density of lithium, thus giving the greatest density difference between the cation or oxidant comprising the heavier metal species to facilitate separation by gravity or centrifugal forces.

The disclosed method can be a continuous process or a batch process. The term "batch process" refers to a mode of carrying out the disclosed method in which the reductants and chemical stream are reacted in a reactor under suitable conditions to allow the reductant to react, reduce, and/or remove the oxidant or undesired chemical species in the stream. The process is then terminated, and the reaction products along with the excess reductant and non-reducible chemical species are removed from the stream. On the other hand, a "continuous process" refers to a mode of carrying out the disclosed method wherein reagents (fresh reductant and/or additional chemical stream) are added on an ongoing basis to a reactor in which a reaction is occurring and reaction products are simultaneously removed on an ongoing basis.

If operated in batch mode, the reactor is preloaded with enough reductant (e.g., reactive metal) to reduce, react, and/or remove all of the oxidant or undesired species in the stream being fed to the reactor, plus an excess so that after all the oxidants have reacted and the reaction is complete, there still remains unreacted reductant in the reactor. For example, if a liquid waste stream comprising 50% water and 50% PFAS (fluorine-comprising organic molecules) is fed to a batch reactor preloaded with metallic sodium and heated above the melting point of sodium, the reactor is loaded (either before or after the waste) with enough metallic sodium to react with all of the water and all of the PFAS compounds according to the following reactions.

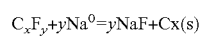

$$C_xF_y + yNa^0 = yNaF + Cx(s)$$

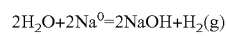

$$2H_2O + 2Na^0 = 2NaOH + H_2(g)$$

In addition, an excess of metallic sodium is present, such that when all of the reaction is complete, unreacted metallic sodium remains within the reactor.

If operated in a continuous mode, reductant can be added to the reactor or associated piping at some advantageous addition point. In addition, material can be drawn out of the reactor or associated piping at some advantageous removal point. In some embodiments, there is always an excess of liquid metal in the reactor/piping reaction zone. After the reaction zone is exited and the oxidant or waste is completely consumed by the excess liquid metal in the reaction zone, then the concentration of the liquid metal need not be maintained in excess.

It should be appreciated that the exothermic reactions contemplated in the presently disclosed subject matter can be handled safely, especially if the mass of reductant (e.g., molten metal) is significantly larger than the mass of oxidant or unwanted species (e.g., POPs) that are being added or the volume of the reactor is significantly larger than the volume of the liquid metal, oxidant, and the non-reducible chemicals and any by-products of the reaction. In some embodiments, a "significantly larger" volume refers to a volume capable of accommodating the feed streams, the unreacted liquid metal and unreacted non-reducible species, any other contents of the reactor, the by-products formed, and the thermal expansion of any gases as they heat up due to the reactor temperature and the heats of reaction, whereas the "significantly larger" reactor volume is able to accommodate this gas expansion without exceeding the operating pressure of the reactor. Typically, a vessel design pressure at least ten times that of the operating pressure is sufficient to contain any gas expansion and overpressurization that may tend to occur.

The preferred temperature to operate the disclosed system will depend on the feed streams, the oxidants, the desired degree of completion of reaction of the oxidant, the nature of the non-reducible species, the desired speed of reaction, the availability of utilities such as steam or electricity to raise the temperature of the reactor when applied to the outside shell of the reactor, the reactor type and physical size and dimensions, the byproducts being formed, the nature of the byproducts such as carbon particles and metal halide salts and metal hydroxides and how they will be treated in the reactor and separated after the reaction reactor, etc. Such factors can be calculated and taken into account in selecting the desired operating temperature by those of ordinary skill in the art.

In some embodiments, the heat of reaction or heat of a chemical stream exiting the reactor of the present invention is recovered and used for a useful purpose, including the purpose of heating a stream feeding the reactor, as is commonly practiced in the art.

In some embodiments, the temperature of the reaction can be selected such that the products of the reaction remain liquid or in an easily suspended form. For example, when sodium is used as a reductant and the chemical stream comprises water and/or water vapor, sodium hydroxide will be formed. It may be desirable to operate the reactor at a temperature above the freezing point of sodium hydroxide (318° C.) to ensure the flowability of reaction products from the reactor.

At arrow 71 in FIG. 3*a* or arrow 128 in FIG. 4*b*, the unreacted reductant, non-reducible species if in a liquid form, and at least some of reaction products are removed from the reactor. In some embodiments, the disclosed method includes separating the reaction products from any unreacted reductant, unreacted oxidant, and/or non-reducible chemical species. The unreacted reductant can be circulated back to the reactor or used again.

In some embodiments, the reaction products can separate into multiple liquid phases that can be separated by density and other standard techniques. The reaction products can be discarded, used in another process, sold, etc. The present method and system provides a means of making salable products from waste halocarbons.

Advantageously, the disclosed system and method increases the value of the chemical stream or non-reducible chemical species by removing, destroying, and/or changing the chemical nature of an oxidant in the chemical stream. For example, a rancid vegetable oil may be treated with this method and system with the result of destroying, removing, or reducing the chemicals that cause the rancid flavor, which are usually created by oxidation of the oil constituents.

In some embodiments, the reactor is not damaged or destroyed by removal of the excess reductant and reaction products and can be reused.

The presently disclosed subject matter includes a system and method for treating an oxidant (such as a halocarbon) with a reductant (such as a liquid reactive metal) near, at, or above the auto-decomposition temperature of the oxidant. In this way, the reductant (e.g., sodium) destroys the oxidant (e.g. halocarbons). At the same time, auto-decomposition reactions also destroy the oxidant. Thus, two essentially irreversible reactions act on the unwanted or oxidant species to effect complete destruction to non-detect levels if desired. If a portion of reaction mass moves through the reactor in such a manner that the chemical stream is not well mixed with the reductant, or if a crust of carbon forms around the species to be reacted and prevents sodium (or reactive metal) from reaching the unwanted species, the elevated temperatures near or above the auto-decomposition temperature of the oxidant will act as a back-up reaction mechanism to also destroy the oxidant. Thus, the probability of complete destruction of the oxidant is improved.

In addition, when operating at elevated temperatures, the vapor pressure of the reductant will increase in the reaction zone, thus filling the vapor spaces with more reductant (e.g., reactive metal vapors) which may potentially permeate with reactive metal vapors (e.g. sodium vapors) any bubbles or vapor spaces and any solid particles that may house unreacted halocarbons or oxidants, thus further facilitating the destruction or reaction of the oxidant. As a result of the higher vapor pressure of the reductant, the liquid reactive metal is allowed to permeate vapors, liquids, and solids to ensure complete destruction of the halocarbon. For example, the auto-decomposition temperatures of some halocarbons are in the 300-400° C. range. Mixing the chemical stream with an excess of reactive metal, such as sodium, heating above 400° C. in the reaction zone, and providing sufficient residence time should produce complete destruction of the unwanted species.

Reactive metals such as alkali metals are ideal for use in this process because they can be heated to very high temperatures without generating significant vapor pressures, and thus the entire process can be conducted in low pressure reactors and piping. In the above example using sodium as the reductant, the reaction mass can be heated to about 882.8° C. before the vapor pressure of the reductant reaches one atmosphere (due to the vapor pressure of sodium reaching one atmosphere as it reaches its boiling point at 882.8° C.). This feature of the reactive metals allows for easy raising of the temperature above, or significantly above, an oxidants' auto-decomposition temperature, thus resulting in another favorable reaction occurring to destroy the unwanted species.

Similar to the above description of raising of the temperature above the auto-decom position temperature of the oxidant, the reductant can be heated to impart enough energy into the oxidant to exceed the bond disassociation energy of the carbon-halogen bond. The heating and energy transfer can be performed in low pressure piping due to the low vapor pressure of liquid metal (e.g., sodium up to 882.8° C. is still at or below one atmosphere of vapor pressure). The disclosed method thus uses reductants (such as reactive metal) as a reaction medium through which enough energy is imparted to the unwanted oxidant species to break apart its chemical bonds.

The disclosed method can include the use of mixed reductants (e.g., mixed reactive metals, including low grade, less pure liquid metals) to destroy an oxidant, such as a halocarbon species. For example, sodium metal that is contaminated with impurities and not readily salable in the marketplace may find ready use in the disclosed method as described herein.

The disclosed method can comprise multiple stages. Particularly, the first stage can include a larger and/or higher excess of reductant, while the second stage comprises a relatively smaller and/or lower excess of reductant. Such an approach is useful for achieving higher yields and use rates of the reductant. For example, a first stage reactor that uses a larger excess of liquid reactive metal is useful for ensuring complete destruction of the halocarbons or unwanted chemical species fed to the process and may be useful for treating large volumes of gaseous wastes, for example. However, the resulting mixture, when purged, still includes the larger excess of reactive metal, which, when diluted with water to form the metal hydroxide for sale or disposal, results in a large yield loss of reactive metal. With a two-stage process, the purge stream from the first stage with the larger excess can be sent to a more controlled reactor (e.g., a batch reactor) in which additional pollutants are added under controlled conditions that allow for less of an excess of reductant to accomplish complete reduction of the oxidants. As a result, more of the reactive metal is used, reducing the excess reactive metal concentration. An excess in the second stage is still maintained in this example, however, to ensure complete destruction of the unwanted species.

The disclosed method can include a two-stage process to produce essentially halocarbon-free metal hydroxide liquids or solids from an aqueous stream comprising halocarbons. Particularly, the halocarbon-comprising aqueous stream can be reacted with a sufficient quantity of reactive metal(s) to react all of the halocarbon, water, any other species in the stream that is capable of reacting with the reactive metal. Excess reactive metal remains after the completion of all reactions. In the second stage, the resultant products of reaction and excess reactive metal from the first stage are reacted with excess water or steam to completely react the excess reactive metal and form an essentially halocarbon-free metal hydroxide liquid or solid of desired water concentration.

In some embodiments, the feed can be pre-vaporized prior to feeding into the reactor, which can be useful for feed streams that include high levels of water to minimize flashing, the sudden evaporation and expansion of water prior to its reaction. Flashing can be dangerous and destructive to equipment, and it is better to avoid the flashing of water or other liquids when fed to the reactor if at all possible.

The presently disclosed system and method offer many advantages over the prior art. For example, the presently disclosed subject matter offers up to about 100% efficient capture and destruction of an oxidant (e.g., a halocarbon). Thus, at least about 50, 55, 60, 65, 70, 75, 80, 85, 90, 95, 99, 99.9, 99.99, or essentially 100% of the oxidants within a chemical stream can be removed, reacted, and/or reduced. This contrasts to a scrubber system which will rarely achieve more than 99% capture of some halocarbons. Even with incinerators it is difficult to achieve the extremely high levels of halocarbon destruction this process can provide if designed and operated properly.

The disclosed system and method further provide for rapid, one-step, low pressure removal, reduction, and/or reaction of an oxidant from a chemical stream.

The disclosed system requires a relatively small capital investment and footprint compared to prior art systems. The disclosed system potentially eliminates scrubbers, thermal oxidizers, thermal oxidizer scrubbers, thermolysis reactors, $CaF_2$ units, granular activated carbon (GAC) absorbers, and the like. The term "eliminating or reducing the need for at least one of a scrubber, a carbon absorber, or an incinerator" and similar language refers to the ability of the present invention to allow the facility operator to avoid having to install or operate said equipment or to operate it less frequently or to a lesser degree. For example, if a gas scrubber followed by a carbon absorber on the gas stream exiting the scrubber is typically operated so as to collect 100 pounds per day of halocarbons in a halocarbon manufacturing facility, the installation of a system and method of the present invention upstream of the gas scrubber may collect and destroy 98 or more pounds per day of halocarbon, which in turn results in a requirement or load on the scrubber and absorber to remove only say 2 pounds per day or less of halocarbons, thus making the scrubbing solution and carbon absorbents last much longer, and thus the need for the scrubber and carbon absorber are reduced. In a new installation with the present invention, using the previous example as an illustration, a scrubber and carbon absorber needing to remove only 2 pounds per day or less of halocarbon would usually be smaller and cheaper than equipment removing 100 pounds per day; this illustrates another example of what is meant by reducing the need for at least one of a scrubber, an absorber, or an incinerator. Similarly to the examples above, the load on an incinerator may be reduced (that is the quantity of halocarbon waste that the incinerator is tasked to destroy) or the need for an incinerator may be eliminated altogether with the present invention.

The present invention fulfills most or all the functions that scrubbers and activated carbon or other absorbents serve in capturing halocarbons; the reactive metal reductant "scrubs" and "absorbs" the halocarbons that are fed to the reactor. In addition, the reactive metal in the present invention will essentially instantly and irreversibly break the halogen-carbon bonds and destroy the halocarbon properties of the molecule. In this sense, the present invention is superior to any scrubber and any absorber that are scrubbing or absorbing halocarbon waste streams: in the present system and process the halocarbons are captured and destroyed all in one step. In this way the present invention is able to eliminate or reduce the need for these unit operations. The present invention also serves the same function as an incinerator; incinerators use heat and oxygen to oxidize the halocarbon and break the halogen-carbon bond. The present invention uses a reductive process instead of an oxidizing process to accomplish a similar purpose, and with excellent mass transfer and contacting of the oxidants with the reductants which the present embodiments provide, the same goal of destroying the halocarbons to very high degrees is achieved as with an incinerator only without the need to burn a fossil fuel at the point of halocarbon destruction. Thus, the present process eliminates or reduces the need for an incinerator to destroy halocarbons.

The disclosed system and method are also flexible and broadly applicable to applications where halocarbon destruction or removal is desired. Specifically, any gas, liquid, aqueous, or non-aqueous halocarbon waste can be reacted and destroyed by this process. Even some solid halocarbon wastes can be fed to this process to be reacted and destroyed. The equipment necessary to operate the system and process of the present invention may require a smaller footprint and may even be able to be mounted on portable structures often labeled as "skids" to those knowledgeable in the art. Such versatility enables the system and method of the present invention to be located at more locations or more convenient locations in a facility that manufactures or uses halocarbons, for example, to better facilitate higher levels of halocarbon emission and destruction.

Prior art caustic scrubber technology removes gaseous halocarbons from a gas stream which often also comprises nitrogen gas by passing the gas through a liquid, often a liquid flowing down in a packed column designed for the purpose of providing good contact between the gas and liquid with the gas flowing up, the purpose of which is to absorb the halocarbon in the liquid which usually is an aqueous caustic solution. Many other scrubber designs are also used in the art, and any device or method that facilitates the capture and removal of a substance such as a halocarbon from a gas stream into a liquid stream is included in the meaning of scrubber. The prior art scrubber technology neutralizes hydrogen fluoride (or hydrogen chloride, etc.) and acid fluorides (or acid chlorides, etc.), offers typically 95-99% capture efficiency of the halocarbon, 0% destruction of halocarbons, and generates a large mass of halocarbon aqueous waste, sometimes significantly larger than the original halocarbon waste stream being fed to the scrubber. In comparison, the disclosed system and method neutralizes hydrogen fluoride and acid fluorides, offers up to 100% capture efficiency, up to 100% destruction of halocarbons, and produces halocarbon-free, environmentally safe effluents and by products.

Advantageously, the reductant (e.g., sodium) does not require dispersing in hydrocarbon solvent and/or oil prior to be used in the disclosed method. Because the reductants are not dispersed in oil, the disclosed method is more cost efficient (e.g., the extra expense of dispersing reductant in oil is saved). In addition, no specialized equipment and processing steps for dispersing the reductant in oil are needed. Further, there are very few manufacturers of metal dispersions which make them much more difficult to reliably source. When reductant is dispersed in oil, the oil is inevitably contaminated with the undesired oxidant species (e.g., POPs) and process stream. As a result, the potential to generate another organic waste stream comprising the undesired or oxidant species that must be disposed of is created. Further, the temperature limitations of oil-based metal dispersions can prohibit them from being used and being stable at the higher temperatures described in this invention. A further disadvantage of oil-based dispersions of metal reductants is that they are immiscible with aqueous streams and polar molecules, thus greatly limiting their usefulness. Further, oil/metal dispersions may be destabilized by some oxidants or undesired species (e.g., POPs), perhaps by species that are surfactant in nature. Also and importantly, dispersing metal in an oil greatly dilutes the concentration of the metal such that on a volume basis the reductant will be much less concentrated and effective. As a result, the reactor and equipment using reactive metals dispersed in oils must be larger and the mass of material handled to destroy a given amount of undesired species is significantly increased. The presence of an oil as a carrier for the dispersed metal will inhibit reactivity because the undesired species must diffuse through oil before it will be able to react with the metal. As a result, the overall rates of reaction are slowed and possibly prevent the ability to achieve high destruction efficiencies in certain streams. Finally, dispersions of metals in oil are much more expensive and less effective when compared to using a feed stream of metal not dispersed in oil or carrier liquid, as described in the present invention.

Further, using reactive metal dispersed in hydrocarbon carriers and solvents may not be useful in treating hydrocarbon streams, as the hydrocarbon solvents and carriers of the dispersion can mix with the hydrocarbon product and either contaminate it or require further separation steps to remove it from the hydrocarbon stream being treated.

Prior art use of metal vapors to etch or react with halocarbon streams are inferior to the disclosed system and method. For example, heating metals to the point of achieving a significant concentration of the metal in a vapor stream, to be economical in commercial reactions, would require the metal to be heated to or near its boiling point, thus requiring extreme temperatures and exorbitant amounts of energy to reach those temperatures. Furthermore, the concentration of the metal in a vapor form is far less than the concentration of the metal in a liquid form; in terms of density of the metal and mass of reactive metal available for reaction per volume of reactor space available, vapor phase reduction without liquid phase reduction would be far less efficient. Therefore, the reactors for a vapor phase reaction would need to be much larger to accomplish the same rate of destruction or removal of chemical species in terms of mass of reacted species per time. With the need to heat the metal to vaporize it, the energy costs of operating such a metal vapor process would make the process prohibitively expensive and negate some of the benefits of the present invention over incineration. To achieve the high throughput, high destruction efficiency, low cost, and high equipment volume efficiency of the disclosed system and method, a vapor process is not practical or commercially useful.

Prior art techniques such as the sodium fusion lab test (also called Lassaigne's test) for nitrogen, sulfur, and halogens are commonly used in laboratories. This qualitative lab method includes heating solid sodium in a glass test tube with an unknown sample, then quenching the test tube in water to break the tube and solubilize the reaction products in an aqueous medium which can then be subjected to further qualitative testing. However, this method has several drawbacks. For example, the test tube is open, thereby allowing volatile components of the sample, e.g. oxidants, to escape is an environmental hazard and defeats the purposes of achieving high destruction efficiencies of liquid and vapor feeds, which can only be achieved if all of the feed material is kept in the reaction reactor until it can be reacted in its entirety. In addition, open flame is used to heat the test tube and melt the sodium with the sodium fusion test. As such, the sodium fusion lab test is not only a dangerous and wasteful source of heating, but the gases and reaction products from the flame must also be dealt with safely. Additionally, an open flame presents a hazard of combustion with fumes and hydrocarbons and even the halocarbons themselves that may be present in the sample. The entirety of this test must be done in a ventilation hood due to its inherent danger and potential to generate and release toxic fumes into the workspace and environment. The test has the problem of moisture in the air reacting with the sodium, thus creating a safety hazard and consuming some of the reductant. The sodium fusion test further requires the breaking of the reactor, the glass test tube, and grinding the glass pieces in water to recover the reacted product. As such, the method is not suitable for reusing the reactor and the expense of replacing the reactor and the waste of disposing of broken reactors is not practical for commercial operation. It should be appreciated that in some embodiments, glass reactors will not be practical for the disclosed system and method due to its inherent weakness and proneness to breaking, especially with the thermal gradients expected at the larger scales contemplated in the presently disclosed subject matter. Another major problem with the lab test is that it does not provide a means of separating out different components of the reaction after the reactor is completed; any excess sodium, if present, is not recovered but wasted in the water. Likewise, the valuable sodium halide salts and the sodium hydroxide are not easily recoverable after quenching in water. Any carbon particles formed are mixed with broken glass, thereby greatly decreasing any value of the recovered carbon particles.

The sodium fusion test is a qualitative lab process that does not allow the high throughputs and destruction efficiencies possible with a qualitative process. The sodium fusion test uses a piece of solid metal added by hand transfer to the reaction reactor and melts the metal in the reactor, which is impractical on a large commercial scale. Manual feeding of the reaction reactor would be costly, labor intensive, and would expose persons to ongoing safety hazards.

In comparison, the disclosed system and method destroy or remove chemical species from chemical streams in an enclosed reusable reactor without the need for a hood or well-ventilated area. The sodium fusion test breaks the glass reactor by quenching the reactor in water, followed by grinding the glass shards to expose any solid residue that may be on the glass shards to the water, steps not required in the subject method. The sodium fusion test quenches all of the reaction products, including unreacted liquid sodium, in water. In contrast, the disclosed system and method may physically separate the reaction products and unreacted non-reducible species from the reactive metal layer to recover and reuse unreacted reductant and does not require the breaking of a glass vessel.

In comparison, the disclosed system and method allow as much of the unreacted liquid metal as possible to be recovered by various provisions such as filtering out byproducts of the reaction (such as metal salts and solid carbon particles), separating out byproducts of the reaction by two phase liquid separations (such as removing a molten sodium hydroxide phase layer from a layer of unreacted liquid sodium, centrifugation, or by other means known in the art for separation of solid and liquid streams), or separating out byproducts by cooling the mass leaving the reaction zone and crystallizing out certain species (such as solid sodium hydroxide, if present) from the unreacted reductant. In the disclosed system and method, liquids may be separated and solids and useful products may be filtered out, which the sodium fusion process does not accomplish nor anticipate. The sodium fusion test is a qualitative test for the presence of the named species and is not capable of being a quantitative test due to some of the reasons already stated above such as the fact that the test tube is open to the atmosphere, and oxidants may escape the reaction test tube. However, the present invention is intended to capture or retain essentially all of the oxidants in the feed stream for the purposes of reducing, reacting, or removing essentially all of the oxidants present. This is one of the excellent features of the present invention, the fact that it is capable of achieving extremely high oxidant conversion rates, for example capturing, reacting, reducing, or removing greater than 95%, greater than 98%, greater than 99%, or greater than 99.5% of an oxidant such as a waste halocarbon.

To support the non-obviousness of the present method and system, the inventor has discussed certain aspects of the present invention with world class chemists and engineers from the DuPont and Chemours companies skilled in the art of manufacturing and using halocarbons, particularly fluorocarbon based materials, and experts at a company skilled in the art of designing various types of equipment for the use of alkali metals; none of the experts consulted has given any indication that this concept has been conceived or tried previously, particularly for the reduction of halocarbons, and the initial reaction of these experts is often negative due to safety concerns, particularly the concern of water being introduced into the reactor and the potentially explosive evaporation and expansion of gas that may ensue. The features of the present invention address adequately those concerns. Furthermore, the fact that the Lassaigne's test has been in use for nearly 200 years and a system and process of the present invention is until now unknown is further proof of the non-obviousness of the present invention.

A mechanical mass transfer device is a device that uses pumps, pressure gradients, or other electro-mechanical means known in the art for transferring gas, liquid, or solid streams from one vessel to another without the need for human handling of the material. An example of what is meant by a mechanical mass transfer device pertaining to the present invention may be the transfer of molten reductant into the reactor from a feed tank. The feed tank may be loaded by hand or other means with solid pieces of sodium or other alkali metal. The feed tank lid can be securely attached and the tank purged of moisture and air by an inert gas such as nitrogen; the feed tanl is then heated to above the melting temperature of the alkali metal. Once molten, the feed tank can be pressurized with nitrogen to a pressure above the pressure of the reactor. Valves in the piping connecting the feed tank with the reactor can be opened, and a controlled flow of liquid metal mass can be transferred from the feed tank into the reactor. This transfer of a chemical stream from a feed vessel to the reactor is an example of what is meant by a mechanical mass transfer device and is well known to those skilled in the art of fluid transfer. Another example of a mechanical mass transfer device is a pump, also well-known to those skilled in the art. Pumps come in many different types, including centrifugal, gear, diaphragm, piston, peristaltic, electromagnetic, and the like, the choice of which depends on the type of material being transferred and the pressure gradient that must be overcome to effect the transfer. Gravity transfer of fluids or solids from one vessel to another is another example of what is meant by a mechanical mass transfer device. For example, a hopper may be located above the reactor into which solid pieces of alkali metal are placed; the hopper may be placed on load cells or weigh cells. A rotary vane-type valve may be located underneath the discharge of the hopper, which may be turned either manually or, as is most often the case, with a motor. The speed at which the rotary valve is turned dictates the amount or rate of mass transfer of solid reductant from the hopper to the reactor. Yet another example of a mechanical mass transfer device is a compressor, used for increasing the pressure of gasses so they can be moved from one vessel to another through piping. Still another example of a mechanical mass transfer device is a vacuum pump, which in this invention can be located downstream of the reactor, such that the vacuum produced is in communication with the reactor. Pulling a vacuum on the reactor with a vacuum pump would help move liquids and gases into, through, and out of the reactor. These examples are not meant to be exhaustive, and any mechanism that does not include the physical picking up and transferring of a chemical stream by human effort into or out of the reactor may be included in the definition of a mechanical mass transfer device. A mechanical mass transfer device may also be comprised of combinations of different types of mechanical mass transfer devices.

The phrase "heating or maintaining the reactor at a temperature sufficient to melt or maintain the one or more molten alkali metal reductants in a molten state" and "temperature control device" and similar terminology related to reactor temperature and reactor temperature control may include applying heat externally to the reactor by using electric heat tracing or a shell built around the reactor through which a heat transfer fluid such as steam or temperature controlled oil is passed to transfer heat to the vessel. In some embodiments, the use of a flame to heat the external surface of the reactor is excluded from the definition. In some embodiments, the heat of reaction given off by the reductant reacting with the oxidant will liberate enough heat to keep the contents of the reactor above the melting temperature of the alkali metal and may even exceed the desired operating temperature in the reactor. In such situations it may be desirable to apply coolant to the reactor shell, which is commonly done in the chemical industry by the use of cooling oil or cooling medium such as a water and glycol mixture passed through the shell of the reactor. In still other embodiments, neither heating nor cooling may be necessary, as the heat of reaction may provide enough heat to raise or maintain the temperature of the reactor above the melting temperature of the reductant, and no further cooling or heating is needed to facilitate the desired reaction and any necessary temperature control of the reaction. All of these modes of operation related to heating or cooling the reactor or passively allowing the reactor temperature to rise or fall with the heat of reaction, along with the associated systems and methods for accomplishing those modes of operation, are included in the definition of "heating or maintaining" the reactor temperature and a "temperature control device."

The present system and method are also effective for oxidizing an alkali metal using a halocarbon, a chemical species comprising a carbon-sulfur bond, a carbon-nitrogen bond, or a carbon-oxygen bond, or a metal or metalloid not taken from Group 1 alkali metals in an oxidized state.

The presently disclosed subject matter has many benefits, including the ability, after the reaction is complete and the oxidant is reduced, to separate or recover byproducts, non-reducible species, unreacted alkali metal, and other components of the reaction. For example, unreacted alkali metal comprising carbon particles or any other solids such as metal hydroxides or metal halide salts may be filtered to recover such solids. The stream may be cooled and processed by means known in the art to help facilitate the solidification, crystallization, or precipitating out the different chemicals or byproducts. Benefits of such separations are that the various products and byproducts may have different values, and the separation is a means of recovering value from the various components. If the liquids exiting the reactor are separated, and the excess liquid metal reductant is able to be purified to any extent by the selective removal of at least one of a metal halide salt, a metal hydroxide, a particle or other solid, or a non-reducible chemical, then the excess liquid metal reductant is better able to be recovered and recirculated back into the reactor, which of course will improve the economics of the process and reduce waste. Excess liquid metal will be required to ensure complete reaction with the oxidant, but the more that excess liquid metal can be recovered and reused, the more efficient the process will be. And the byproducts such as the metal hydroxide and metal halide salts or other byproducts may be able to be purified enough to be sold or used in another process. Separation of the hydrogen gas generated from moisture present may be collected and used as fuel or in some other chemical process, or it may be fed to a fuel cell to recover electrical power. Separation of the non-reducible chemical species, if present, from the excess reactive metal is also an important feature of this system and method. For example, the ability to remove halocarbons or moisture or oxidants from nitrogen or natural gas by mixing the gas with molten reductant and then allowing the liquid and non-reducible gas and gas byproducts (e.g. hydrogen) to separate in the reactor or in a vessel designed with the ability to act as a liquid/gas separator, a unit operation well known in the art, is a useful embodiment of this system and method in the treatment of gases that comprise non-reducible chemicals.

Feeding the reductant to the reactor as a liquid and not a solid is another embodiment of the present system and method that has the benefits of not having to provide a mechanical solid alkali metal feed system into the reactor and not having to provide a means of heating up the solid alkali metal once it has been fed to the reactor. Examples of how both liquid and solid reductant might be fed to the reactor have previously been provided.

Treated streams (such as those comprising non-reducible species) leaving the reactor may also comprise residual unreacted sodium. This excess sodium may be treated in the following ways and in other ways known in the art. For example, sodium vapors in a non-reducible gas stream such as methane or ethane or natural gas or nitrogen, etc. may be removed by cooling the gas to below the freezing point of sodium, at which point the vapor pressure of the sodium will be extremely low, and the sodium will condense out as a solid in some vessel or on piping that has been designed for the purpose of removing a vaporous alkali metal from a gas stream. For example, the gas can be cooled as it passes through a vessel with internal surfaces or protrusions that allow for the metal to condense on, and periodically the incoming gas stream can be stopped or switched to a second such vessel, and the first vessel with the solid metal on the walls or protrusions can be heated, the metal melted, collected, and removed from the vessel and the vessel cooled again and prepared for another cycle of removing the condensable metal vapors from a gas stream. In another example of treated streams leaving the reactor which may comprise residual unreacted sodium, a hydrocarbon liquid stream that has been treated by the present invention could comprise some unreacted metal suspended in the hydrocarbon stream. This unreacted metal can be removed, if desired, in the following ways or in combinations of the following ways or by using other methods known in the art. First, the stream may be cooled as described above with the gas, below the melting temperature of the alkali metal, and some of the solid metal may crystallize or solidify on the surfaces of the cooled vessel. Third, the hydrocarbon may be washed with another substance such as water. Any residual unreacted metal will react with the water and be converted to the metal hydroxide and hydrogen gas. Third, an electric field or electric current may be applied to facilitate the movement of the metal out of the hydrocarbon phase and onto a vessel surface or into a second phase. Fourth, the residual metal may be removed by gravity by settling or by centrifugation, taking advantage of a difference in the density of different chemicals or chemical species. Fifth, the stream may be treated with water vapor, which will permeate the hydrocarbon stream and react any residual unreacted alkali metal. Sixth, the stream may be treated with a volatile acid such as HCl, or a volatile acid and water vapor, to react and neutralize the residual alkali metal and any metal hydroxide formed. Seventh, the stream may be treated with a halogen gas such as $F_2$ or $Cl_2$, forming a metal halide salt. Alternatively, the stream may be treated with other means known in the art for removing suspended or dispersed or dissolved or vaporized alkali metal from a chemical stream.

A reactor of the present system and method, such as depicted in FIG. 3a, may be oriented vertically, horizontally, or in some other orientation as best suits the application. For example, if a high pressure gas stream such as a natural gas stream is being treated, the reactor may be oriented vertically with the shaft vertical. The liquid metal will pool toward the lower end of the reactor, and the high pressure stream can be added at the bottom of the reactor. This orientation ensures that the gas will have to push through and be contacted with the reactive metal. Because the gas has a high pressure to begin with, the extra pressure drop that will result from the gas having to push through a head of molten alkali metal may not be a problem. In other applications, where pressure drop of a gas being treated with the present invention is of concern, and it is desirable to not have to use a compressor to compress the gas, a reactor of the present invention such as depicted in FIG. 3a that is not filled with molten metal but has a vapor space above the metal may be oriented horizontally to allow for gas to flow through the reactor without having to push through a head of molten metal. In such situations, it is possible to pull a vacuum on the system downstream of the reactor to help pull vapor and liquid feeds into, through, and out of the reactor vessel. Orienting the reactor vessel in a horizontal orientation should help reduce the pressure drop through the reactor.

EXAMPLES

Prophetic Example 1

Halocarbon Reduction

Halocarbons are defined as any chemical species that comprise a carbon-halogen bond. Halogens are any atom taken from Group 17 of the periodic table (e.g., fluorine, chlorine, bromine, and iodine). Envisioned uses of this aspect of the process to destroy or remove halocarbons can include, for example, a chemical plant that processes halocarbons. Vent streams can include halocarbon vapors and/or the halocarbons can be present in a stream of nitrogen and/or water vapor. The vent streams can include one or more of acidic fluorocarbons, chlorocarbons, halocarbons, HF, HCl, and the like. Typically in current commercial operations, the streams are collected in a scrubbing system that comprises a circulating aqueous caustic solution utilized to neutralize the acidic species and capture the halocarbons in water.

However, prior art systems have several major disadvantages. For example, scrubbers create a significantly larger mass waste stream with the halocarbons diluted in an aqueous solution, which must then be disposed of. In addition, it is difficult (if it is even possible at all) and expensive to design a scrubber that will capture greater than 95%, 98%, 99%, 99.5%, 99.9% of a halocarbon species. Further, gases leaving the system scrubbers may be vented to the atmosphere, thereby polluting the environment with halocarbons. Alternatively, gases leaving scrubbers are frequently passed through an activated carbon unit to further capture the halocarbons. However, this requires additional processing equipment, additional costs of the activated carbon, additional mass of waste material that needs to be processed (the spent carbon laden with halocarbons), etc.

Alternatively, the halocarbon process vent gases can be fed directly into a reactor as disclosed herein, eliminating the scrubber and activated carbon and incinerator systems altogether. The reaction of molten sodium, for example, with the halocarbon to destroy the halocarbon and produce NaF, NaCl, etc. is essentially instantaneous, goes to completion, and is irreversible. If the reactor is equipped with excess of molten sodium relative to the amount of halocarbon and total oxidants fed to the reactor, the only way the halocarbon can get through the reactor unreacted is if the mixing with the sodium is incomplete and halocarbon gases are able to pass through the reactor without being brought into intimate contact with the reductant. With reactors featuring dynamically mixed chambers as described herein (or in a series of reactors, or in many other types of reactors that can be conceived and designed to accomplish intimate contact with the oxidants and reductants), the reductant and oxidant are forced together and thoroughly mixed to prevent gas and liquid bypassing. The disclosed system can optionally be operated at elevated temperatures (e.g., above 318° C.) to ensure high reactivity, to keep any NaOH formed in a molten state, and to benefit from any auto-decomposition that may occur to the halocarbon at the high temperatures. In addition, the elevated temperature can function to increase the vapor pressure of the liquid metal, allowing vapor phase metal to help react with the halocarbon in addition to the liquid phase metal, thereby allowing very high capture and destruction efficiencies of the halocarbon to be achieved.

Those skilled in the art will appreciate that if moisture is present in the gas stream, it will be reacted by the sodium to produce hydrogen and sodium hydroxide. At the end of the reaction zone in the reactor or external to the reactor, any vapors present (such as nitrogen and byproduct hydrogen which in this example are non-reducible species) can be separated by allowing the liquid to settle in a disengagement vessel common in the art. Such vessels are known in the art and are used to separate liquids and gases. Accordingly, the gases (now free of halogens) can be directly vented to the atmosphere. Alternatively, if there is concern that the reactor did not sufficiently eliminate the halocarbon, the vent gases can be passed through another reactor and the process repeated in a series of reactors until the non-reducible gases are free of halocarbon to a desired level. The gases can then be collected or vented to the atmosphere.

If the gases exiting the reactor include substantial amounts of hydrogen, the gases can be passed into a process that uses, consumes, reacts, burns, and/or otherwise recovers value from the hydrogen.

Due to the elevated temperatures used in disclosed system and method, sodium or metal vapors will be in any non-reducible gases exiting the reactor; these metal vapors can be removed by cooling the gases (preferably to below the freezing point of the metal reductant), causing the metal vapors to condense on an internal surface. The gases thus cooled can then be vented to the atmosphere. Alternatively, the vapors can be scrubbed with a simple water scrubbing system to remove any remaining metal vapors. The liquids leaving the reactors will include any excess sodium metal, NaF or Na—X to denote halogen salts (depending on the halocarbon being destroyed), NaOH if moisture was in the feed, and any other liquid non-reducible chemical species.

Furthermore, carbon may be produced by this reaction, and (depending on the reductants and reaction conditions) it may exist as carbon particles that can be filtered from the reaction liquids. Any suitable filter can be used, such as a sintered metal filter, sintered or fibrous glass filter, other filtration element known in the art for removing particulates from liquid streams under these conditions. The recovered carbon may have usefulness in any number of processes or products that use carbon particles, such as fillers or absorbents. If desired, the recovered carbon particles may be washed with water to react any remaining metal, neutralized with an acid to remove the sodium hydroxide, dried, and disposed or used in various products as described.

Sodium hydroxide that forms in the present example (e.g., if moisture is present in a feed stream) may be separated out by cooling the reaction mixture to below the freezing point of sodium hydroxide (318° C.). At that point, the sodium hydroxide may be able to be crystallized or filtered out of the excess reactive metal phase as a solid, potentially taking along with it the sodium halide salts.

The sodium fluoride or sodium halide salts in this example may exist as solids that can be filtered out, since the temperatures will normally be below or can be cooled to be below the melting points of those salts. Alternatively, the salts may remain with the excess reductant or a separate NaOH phase.

The reactive metal (molten sodium in this example) can be fed to the reactor in a high enough excess so that it overwhelms all oxidants and removes them or reacts with them to a very high extent. In some embodiments, only trace amounts or no detectable quantities of oxidant are left after the reaction is complete, which is a key advantage of this invention. In addition, the excess molten reductant can also act as a carrier fluid to carry the reaction products (e.g. carbon particles, metal halide salts, sodium hydroxide, and other byproducts) out of the reactor where they can be separated from the excess molten metal as described above.

In some cases, a two-phase liquid system forms which can be settled out into two layers that can be separated using methods well known in the art for example for separating two liquid layers of differing densities. After the desired separations of reaction products from the excess liquid metal are performed, the excess liquid metal can be recycled back to the reactor or sent to another process for recovering value from the unreacted reductant. Alternatively, the excess liquid metal can be recycled back to the reactor or sent to another process before the reaction products are separated. In these embodiments, eventually the excess liquid metal may become so laden with reaction products and may be depleted in excess liquid metal to the point where the entire stream may be sent to another process step for treatment and/or recovery of chemical species and a fresh stream of liquid metal used to feed to the reactor.

The reactor can be configured as a batch reactor, with feeds added at one time and the reaction run until a set time or condition is met. Alternatively, the reactor can be configured as a continuous reactor, where the chemical stream and reactive metal stream are continuously added and the reaction products and non-reducible species are continuously removed from the reactor.

Prophetic Example 2

Halocarbon Reduction with Gaseous Halocarbon Oxidants, Including Monomers

The halocarbon stream can comprise gaseous halocarbon species, including monomers, such as from a plant that makes fluoropolymers and uses TFE (tetrafluoroethylene), CTFE (chlorotrifluoroethylene), and/or other gaseous halocarbon monomers, that may have become contaminated or are not believed to be economically recoverable. Other gaseous halocarbon streams treatable in the present invention include refrigerants such as 2,3,3,3-tetrafluoropropene, HFO-1234yf, which is a hydrofluoroolefin (HFO) with the formula CH2=CFCF3. Refrigerants also include haloalkanes, chlorofluorocarbons (CFC) and hydrochlorofluorocarbons (HCFC), particularly CFC-11 and CFC-12, hydrofluorcarbons (HFCs), and perfluorocarbons (PFCs).

The gaseous halocarbon streams can be fed to the disclosed reactor along with liquid metal reductant (e.g., sodium).

The halocarbon gases will be converted to sodium halide salts and carbon residues when brought into intimate contact with the liquid sodium metal. This example differs from the previous example in that in this example, the halocarbon stream may comprise less moisture and less nitrogen or may be pure halocarbon. In this example, the relative proportion of sodium hydroxide formed will be lower, and the proportion of metal halide salts formed will be higher. Also, the amount of volume of reactor space needed for non-reducible species such as nitrogen will be less, and the reactor may be more liquid full of reductant in such situations. In the case of pure gaseous halocarbon chemical streams (especially perfluorinated halocarbons or halocarbons with higher percentage by weight of halogens in the molecule) reacting in an intimately mixed reactor as disclosed herein in the presence of excess molten sodium, there may be little to no vapor phase leaving the reactor. Most or all of the feed halocarbon gases may be converted to solid carbon particles and halide salts and may be carried out of the reactor with the excess molten sodium for further processing and separation, as previously described. In situations where used refrigerants are being disposed of, this process may be used in place of incineration, thus avoiding all of the challenges and negative problems associated with it.

Prophetic Example 3

Halocarbon Reduction with Liquid Halocarbon

In the related example of feeding a chemical species stream that is predominantly or entirely liquid halocarbon, an additional problem is presented. Halocarbons generally have a lower boiling temperature than hydrocarbons of similar carbon length. As a result, the liquid halocarbons entering a reactor at the temperatures at which this process is operated can immediately flash into a gas until they are reacted and destroyed by the molten sodium.

The presently disclosed system and method addresses this issue with the provision of a reactor with a large enough volume relative to the rate at which the liquid is fed to accommodate such expansion. Alternatively, the feed stream can be vaporized prior to feeding the stream to the reactor. Once in the reactor, the destruction of the halocarbon rich feed stream proceeds as described previously with the halocarbon rich gaseous feed stream.

Prophetic Example 4

Halocarbon Reduction with Streams Comprising Water/Water Vapor

Often liquid or gaseous streams that include halocarbons can comprise significant quantities of water or water vapor (e.g., greater than about 10, 20, 30, 40, 50, 60, 70, 80, 90, 95, 98, 99, 99.5, or 99.9% water or water vapor by weight or volume). There are several challenges presented by chemical streams comprising significant amounts of water or water vapor. For example, when the stream is fed to the reactor, the liquid water can flash or suddenly evaporate if the reactor is being operated at a temperature above the boiling point of water. The flashing and/or sudden evaporation can create an overpressure event and may damage the reactor or internal components of the reactor. In addition, the large heat of vaporization required to vaporize the feed stream has the potential to cool the liquid metal to an unacceptable degree. Further, the noise created by such flashing can be extremely loud and bothersome.

However, the flashing problem can be mitigated in several ways. First, the feed can be pre-vaporized, including turning all liquid water into water vapor, in a heat exchanger or evaporator before feeding the stream to the reactor. Second, the chemical stream can be preheated under pressure such that when released into the reactor (which is operated at a lower pressure in this embodiment), the stream vaporizes instantly in the reactor in a controlled manner. Third, the chemical stream can be added to the reactor at a slow rate relative to the size of the reactor and the volume of excess reactive metal. As a result, the instant flashing and vaporization do not adversely affect the overall reactor or internals. Further, the reactor can be sized larger and hold a larger volume of excess liquid metal to accommodate the expansion.

Aqueous feeds are made safer through pre-evaporation. One skilled in the art will recognize that when liquid water streams are directly added to liquid reactive metals that instantly and explosively the liquid water will instantly flash into steam, and as the reaction progresses, hydrogen gas will evolve. Since two moles of water vapor will react to form one mole of hydrogen gas, the latter problem of instant flashing of liquid water is perhaps a more serious problem even than the instant formation of one mole of hydrogen gas from the sudden reaction of two moles of water vapor with molten metal. The preferred solution to this is to pre-evaporate the liquid water feed streams so that the material is fed to the process as a vapor/gas phase. In this manner, the volume of gas feed will be reduced as two moles of water vapor will contract to one mole of hydrogen gas (although the heat of reaction will cause a temperature rise, which will create an expansion of the hydrogen, which can be accommodated by those skilled in the art of reactor design), and the safety of the system can be much improved, and the design simplified. The heat for evaporating the feed stream may be supplied by the cooling of the reactants and streams exiting the reactor, as is commonly practiced in the art.

In some embodiments, the water-comprising feed stream can be mixed into a circulating or agitated liquid reactive metal mass a little at a time due to the violent flashing of water into steam that will instantly take place. For example, in a circulating stream of liquid reactive metal being pumped through a pipe, the water-comprising stream can be divided into multiple streams, each of which is fed at a different point down the pipe rather than all at once in one place in the pipe. This serves to minimize and help control the explosive force of the sudden flashing of water into steam.

Another challenge presented by chemical streams comprising a significant amount of water or water vapor is the proportionately larger amount of metal hydroxide produced. In such situations, operating above the melting temperature of the metal hydroxide (318° C. in the case of sodium) and keeping the metal hydroxide in a liquid form will be beneficial to keeping the reactor free of solids that can plug the reactor and/or interfere with the ability to intimately mix the reductants. It is envisioned that the metal hydroxide, operated above its melting point, could become the dominant phase and carrier fluid for the reaction, with the reactive metal less of a component by mass or by volume than the liquid metal hydroxide.

Advantageously, these embodiments can avoid the requirement of providing a very large excess of reactive metal to carry the excess of metal hydroxide from the reactor. Although the disclosed system and method allows for the destruction of halocarbon oxidants in waste streams with high amounts of water or water vapor, it will be obvious to those skilled in the art that this will be an expensive use of the reactive metal (i.e., to convert water into a metal hydroxide), and care should be taken to minimize the amount of water in the feed to improve the economics of this process. Minimizing the amount of water in the feed can be accomplished by methods known in the art. For example, distillation (to concentrate the halocarbon), molecular sieves (to remove water), membrane separations, and any other method for removing water from a stream comprising water and a halocarbon (or for removing water from other oxidants or non-reducible species as discussed in other embodiments of this invention that do not involve halocarbons) can be used. Thus, the disclosed system and method enables the production of metal hydroxides comprising metal halide salts produced by reacting a stream comprising a halocarbon and water with a reactive metal in a molten state.

If the salts of the halides (e.g., NaF or NaCl) produced by the reaction of the reactive metal with halocarbons are soluble in the liquid metal medium, the liquid can be more easily circulated and processed. If the salts are insoluble and begin precipitating out, then can be made to remove the salts by filtration, crystallization, or other methods known in the art.

Prophetic Example 5

Partial Removal of Oxidant

The presently disclosed system and method can further be used when only partial destruction or removal or reduction of the oxidant is desired, such as in situations where it is desired to lower the level of hydrocarbon in a stream. Particularly, the disclosed system can provide for the use of less than stochiometric amounts of reductant. For example, a chemical stream in a halocarbon processing plant can comprise water and a halocarbon, wherein the halocarbon includes 1% by weight of the stream. Instead of sending the water to an incinerator, solid or liquid metal reductants as described herein can be added to the aqueous stream to produce a solution suitable for use in a caustic scrubber. It should be appreciated that caustic scrubbers may function to scrub halocarbons from gaseous streams.

Upon the addition of the reductant to the water, a portion of the water will be converted to the metal hydroxide, and a portion of the halocarbon will be destroyed. The amount of reductant added can be enough to achieve the desired caustic strength. No excess reductant is required, as is the case in other embodiments where 100% destruction or removal of the halocarbon and other oxidants is desired.

Prophetic Example 6

Capturing Halocarbons Emitted from Facilities

The disclosed system and method can be used to capture and/or destroy halocarbons emitted from facilities that make or use halocarbons, such as (but not limited to) a semiconductor fabrication facility. Such facilities commonly use various types of halocarbons to etch or treat semiconductors during fabrication. After the hydrocarbon gases are used, they must be collected or vented to the atmosphere, which requires a compact and efficient method of capturing and destroying the emissions, preferably without requiring expensive scrubbing and carbon absorber capture technologies and/or an incinerator.

Halocarbons are often captured on carbon particles (such as activated carbon) to remove them from a vent stream or other halocarbon source. After the carbon is spent or fully laden with halocarbon, the carbon can be regenerated by the application of heat and/or steam. The gases generated from the heat/steam treatment may be routed to an incinerator. Alternatively, the carbon with adsorbed halocarbon can be removed from the absorber beds and incinerated. The disclosed system and method can effectively replace the carbon absorber or incinerator or both altogether by processing the process off-gases directly. In addition, the presently disclosed subject matter can be used to process the regeneration vapors when the carbon absorber beds are regenerated with heat and gas (e.g. nitrogen or steam) passed through the beds. The same process and system can similarly be used with non-halocarbon based oxidants captured using carbon bed technologies.

Prophetic Example 7

Hydrocarbon Purification

In addition to halocarbon reduction, destruction, and/or removal from chemical streams, the disclosed system and method can be used to react and/or remove oxidants from gaseous or liquid hydrocarbon streams. For example, the system and method can be used to remove sulfur, nitrogen, and other species from natural gas and refinery hydrocarbon liquid streams and/or from natural oils. The disclosed system and method can further be used to remove sulfur, nitrogen, halogen, and other oxidant species from oils and hydrocarbon streams, used oils, and waste oils (e.g., hydraulic oil, transmission oil, brake fluids, motor oil, crankcase oil, gear box oil, synthetic oil, and grades 1, 2, 3 and 4 fuel oils).

In such applications, the hydrocarbon stream comprises a non-reducible species (usually the hydrocarbon) and a reducible species (e.g., an oxidant). Because in general hydrocarbons will not react with the reductants as disclosed herein, other species and oxidants in the hydrocarbon streams will be reduced or reacted by molten Group I metals. Depending on the oxidant chemical species, the oxidant can be converted in this process to desirable or acceptable chemical species that remains with the hydrocarbon stream. Alternatively, the oxidant can be converted to a chemical species that may stay with the hydrocarbon or transfer to and remains with the excess liquid metal (and thereby is removed from the hydrocarbon stream). In some embodiments, the oxidant and species that reacts with the liquid metal reductant can be converted to a species that forms solid particles (such as carbon or sulfur comprising particles) that can optionally be filtered out of the hydrocarbon or liquid metal streams. Alternatively, the oxidants can be converted to species capable of being removed from the hydrocarbon or excess liquid metal streams through further downstream processing (e.g., washing, extraction, distillation, and the like).

Thus, the presently disclosed system and method can be used to contact and/or treat hydrocarbon streams with molten Group 1 metals. The same or similar equipment and processing techniques described herein for treating halocarbon chemical streams can also be used. However, in general there will be a larger proportion of gas or liquid hydrocarbon that will pass through the reactor unreacted. For example, during applications of halocarbon destruction, a significant amount of volume reduction may be observed as the halocarbon can be completely consumed and converted to solid byproducts.

In embodiments wherein the hydrocarbon is treated, the large majority of the hydrocarbon feed stream passes through the reactor unaffected by the liquid metal (i.e., the majority of the mass of chemical stream will be non-reducible). However, reactor and system designs can be produced to handle the flow of large quantities of unreacted hydrocarbons to and from the reactor using methods well known in the art. In some embodiments, mixing in the reactor will be important to ensure that all of the hydrocarbon stream along with any oxidants it includes is mixed and contacted with the liquid metal.

Prophetic Example 8

Removing Impurities from Hydrocarbon Streams

The disclosed system and method can be used to remove impurities from hydrocarbon streams by reacting, reducing, or extracting the impurities with liquid metal. Particularly, the presently disclosed subject matter can be used to scrub hydrocarbon gases with molten metal to react and/or remove impurities (such as $H_2S$, $CO_2$, $CO$, $H_2O$, $O_2$, amines, sulfides, and other reducible or removable species). It should be appreciated that any of a wide variety of materials can be removed from hydrocarbon streams, such as (but not limited to) dissolved or ionic metals in liquid hydrocarbon streams. The disclosed system and method can further be used to reduce any reducible species from a hydrocarbon stream. The term "reducible" refers to an oxidant or any chemical species that is able to be reduced by one or more molten Group I metals in a hydrocarbon stream as disclosed herein.

The cost of sodium or other metals can be prohibitive for large scale use to clean and/or process raw crude oil or natural gas directly from the well. However, the disclosed system and method can be used to further treat hydrocarbon streams after they have first been processed using conventional methods (e.g., for removing water, $CO_2$, sulfides, metals, amines, and other reducible species).

In many chemical processing units, removing or converting unwanted species to lower specification limits (e.g., a refinery removing sulfur species from gasoline to meet increasingly stringent environmental regulations) can become increasingly expensive. Furthermore, processes that work well to remove the bulk of the unwanted species may be less effective or ineffective at removing an unwanted species to extremely low levels. For example, refineries commonly use hydrotreating (high pressure treatment of hydrocarbons with hydrogen) to destroy sulfur and nitrogen comprising molecules or heteroatoms (hydrocarbons that comprise sulfur, nitrogen, and/or other non-carbon atoms in a cyclic ring). However, these treatments become increasingly expensive and difficult as attempts are made to use these treatments to remove the unwanted species to lower or more stringent levels.

The disclosed system and method can be used to remove or convert an unwanted species when removal has proven to be difficult with conventional methods. The stream is contacted with a liquid metal as disclosed in detail herein above. In this way, at least about 80, 85, 90, 95, 98, 99, 99.5, 99.9, or 99.99% of sulfur, nitrogen, oxygen, heteroatom, and/or other oxidants in hydrocarbon liquid or vapor streams can be removed and/or converted, even down to part per million levels.

Prophetic Example 9

Removing Impurities from Food Grade Hydrocarbon Streams

The disclosed system and method can be used to remove impurities from food grade hydrocarbon streams by reacting, reducing, or extracting the impurities with liquid metal. Particularly, the presently disclosed subject matter can be used to reduce contaminants in food grade oils to remove or react agents that decrease the value and healthiness of the oil. It should be appreciated that any of a wide variety of materials can be reduced or removed from hydrocarbon oils by this method. For example, oxygenated $\alpha,\beta$-unsaturated aldehydes (O$\alpha\beta$UAs), for example 4-hydroxy-2-trans-nonenal, can be generated in cooking oil that has been used for frying at elevated temperatures. O$\alpha\beta$UAs are considered as possible contributors to a number of diseases, such as chronic inflammation, neurodegenerative diseases, adult respiratory distress syndrome, atherogenesis, diabetes and different types of cancer. Treatment with this method and system may convert such unhealthy agents into less toxic species by reducing for example the oxygenated groups of the molecule.

Prophetic Example 10

Reacting/Removing Species from Non-Reducible Chemical Streams

The disclosed system and method can further be used to react and/or remove oxidizable and other species from non-reducible chemical streams. Particularly, it may be desired to reduce the level of a particular species (e.g., an oxidizable species) to extremely low or non-detectable levels (e.g., less than about 10, 5, 1, 0.5, 0.1, 0.001, 0.0001 weight percent, or less). For example, the disclosed system and method can be used to remove oxygen, water vapor, or a species capable of reacting with liquid metal from nitrogen or another non-reducible gas stream.

In other embodiments, the disclosed system and method can be used to digest solid or liquid wastes that include reducible species.

The disclosed system and method can further be used to reduce oxidant chemical species when the oxidant is not destroyed during the reduction but can be separated from or converted to a form that can be separated from the non-reducible stream by assimilation (e.g., by absorption, entrainment, and the like) in the molten metal stream. The species can then be recovered from the molten metal stream.

Prophetic Example 11

Reducing/Reacting/Removing Oxidants from Chemical Streams Without the Use of an Incinerator, a Scrubber, or an Absorber The disclosed system and method avoids the need to build or operate an incinerator, and/or a scrubber, and/or an absorber to destroy a halocarbon or other oxidant which is capable of being destroyed or removed using the disclosed methods. The disclosed system and method may avoid the need to install and operate scrubbing systems to capture or remove a halocarbon from a non-reducible chemical stream. Further, the disclosed system and method avoid the need to install and operate a chemical absorber unit, such as an activated carbon bed system, to capture the halocarbon or other oxidant. Further, the disclosed system may not require equipment over one story high. Further, the disclosed system does not require at the point of destruction or capture of the oxidant the production of carbon dioxide, nitrogen oxides, or other species that are produced by burning of fossil fuels as in the case of an incinerator, although in some processes the burning of fossil fuels may be used to produce the metal reductant. Rather, the disclosed system and method provide a reductive technique for destroying and/or reducing a halocarbon or oxidant in a feed stream. In some embodiments at least about 90, 95, 99, or 99.9% of the halocarbon or oxidant is destroyed and/or reduced in a period of less than about 60, 30, 10, 5, or 1 minute. Thus, at least about 90, 91, 92, 93, 94, 95, 96, 97, 98, 99, 99.9, or 99.99% of the halocarbon or oxidant can be destroyed or removed. Further, the halocarbon or oxidant can be reduced and/or destroyed in a time period of less than about 60, 55, 50, 45, 40, 35, 30, 25, 20, 15, 10, 5, or 1 minute.

Prophetic Example 12

Treatment of Oxidants that Include Metals

In some embodiments, the disclosed system and method can be used to treat oxidants that comprise metals (including halogenated metals), such as $UF_6$, $U_3O_8$, $TiCl_4$, rare earth oxides, and the like. For example, the system and method can be used to treat high-level or low-level radioactive streams or wastes to efficiently collect, concentrate, remove, and/or reduce radioactive species. The disclosed system and method can be used as an alternative to incinerating low-level radioactive wastes and scrubbing the resultant flue gases to remove radioactive species or landfilling the radioactive wastes. Instead, the radioactive wastes can be fed to the disclosed system, where the radioactive species are reduced and may be captured in a liquid alkali metal stream.

The radioactive or other metal species (which will most likely exist as a metallic solid after being contacted with the liquid metal reductant) can be separated out using any suitable method of separating a solid from a liquid, such as (but not limited to) the use of gravity, centrifugation, filtration and the like.

In some embodiments, objects contaminated with radioactive wastes (e.g. personal protective equipment, trash, paper products, floor sweepings, and the like) can be reduced in size and fed to a reactor as disclosed herein. Particularly, the reactor is capable of mixing these size-reduced articles with the liquid metal. A portion of the solid materials will be destroyed by the liquid metal, whereas other portions will not. The objects or particles are washed with liquid metal to reduce the radioactive products and allow them to be carried away with the liquid metal. The unreacted remaining solids can then optionally be washed with fresh liquid metal not comprising radioactive residues, filtered out of the liquid metal (e.g., using a steel mesh strainer or other methods known in the art). Optionally, the unreacted remaining solids can be further treated with water or other suitable chemicals to react any residual reactive metal. The bulk of the liquid metal (which carries the radioactive species) can be treated to separate the reactive alkali metal from the radioactive metal as described herein above or by other means known in the art.

The disclosed system and method can be used to capture metal halide gases (e.g., $TiCl_4$ fumes in a plant that uses the chloride process to produce $TiO_2$). Particularly, instead of sending the $TiCl_4$ fumes to a liquid scrubber, the fumes can be collected in the disclosed invention and titanium metal recovered. The disclosed method likewise can be used to produce titanium or other metals from oxidizable titanium or other oxidizable metal species.

The presently disclosed subject matter can be used in the destruction of chemical warfare agents or other dangerous chemicals. For example, mustard gas (Cl—$CH_2CH_2$)$_2$S will be reduced and destroyed when contacted with liquid reactive metal, as will Soman, Sarin, VX, and other agents comprising phosphorus-fluorine bonds.

Chloroacetophenone, or tear gas, will likewise be treatable with the disclosed system and method. To this end, any toxic chemical that is an oxidant and is reducible by the liquid reactive metals as disclosed herein can be treated, especially chemicals comprising halocarbon bonds.

Biological wastes or chemical streams comprising biological species (such as viruses, fungi, and/or bacteria) in vegetative or spore states, in gaseous, liquid, or solid streams, can also be treated using the disclosed system and method. For example, if incineration of such wastes is not desired, few (if any) organisms are capable of surviving the temperatures and/or reducing/dehydrating strength of the reductants used in the disclosed system.

Prophetic Example 13

Non-Aqueous Chemical Streams

In some embodiments, the disclosed system and method can be used to remove, react, and/or reduce a chemical species in a non-aqueous chemical stream. The term "non-aqueous chemical stream" refers to chemical streams where water is not a major component. Examples include gaseous nitrogen streams where POPs are entrained or vaporized in the gas stream.

In some embodiments, relatively low quantities of non-aqueous streams are combined with relatively large quantities of liquid reductant to allow for heat removal and containment of the violent flashing and thermal expansions that can ensue if liquid halocarbons are fed directly to the reactor and are suddenly vaporized prior to being reduced and consumed. The advantage of adding a chemical species in non-aqueous streams directly to reactive metals is the possibility of achieving destruction of the chemical species (e.g., POPs) in a medium where reaction with water is not a competing reaction and the water does not dilute the chemical species. In some chemical plants, this would entail moving the reactions with non-aqueous streams further up in the process, before the chemical species have been absorbed into aqueous waste streams (such as a scrubber system).

Prophetic Example 14

Molten Sodium Scrubbing Systems

With a melting point of around 98° C. and very low vapor pressures at temperatures up to several hundred degrees Celsius, liquid sodium can be an ideal scrubbing medium for the destruction of POPs in liquid, vapor, or solid streams. In some embodiments, the molten sodium is fed down from the top of an absorber column while feeding a liquid or gaseous stream comprising POPs up from the bottom of the reactor. The column can include inert packing or internal baffles, trays, and the like to facilitate gas and liquid contact in the column and/or provide stages of contact with increasing POP content and decreasing liquid metal purity as one progresses down the column. Such designs are well known in the art and are useful to achieve high-efficiency removal or purification of certain species from a stream.

Scrubbers can be constructed wherein molten sodium is added (e.g., sprayed) into a chamber comprising POP vapors and/or gas streams comprising POPs. In some embodiments, the POPs are moving countercurrent relative to the molten sodium. For example, the POP stream can pass from the bottom to the top of the reactor through a spray or mist of liquid sodium moving from top to bottom. Such a system is ideal for situations in which a low-pressure drop is required for the stream comprising POP vapors. Alternatively, a stream of POP-comprising gases or liquids is passed through a layer of molten reactive metal (such as liquid sodium). For example, a nitrogen purge stream comprising POPs can be bubbled through a stirred reactor that includes molten sodium, wherein the POPs are intimately contacted with the highly reactive molten metal and are reacted, destroyed, and absorbed. However, it should be appreciated that a higher pressure drop in the gas stream will be required, which for some low-pressure streams may not be feasible. To draw low-pressure gaseous streams into a reactor of the present invention, a vacuum may be pulled on a vessel downstream of the reactor, to which a vent on the discharge of the reactor is connected to allow the gaseous discharge from the reactor to be drawn out under vacuum. This vacuum in turn ideally puts the reactor at a lower pressure than the feed source which is the origin of the gaseous stream to be treated, thereby drawing the gases into the reactor under a vacuum without the need for a compressor to compress the gases in order to push them into the reactor.

When fluorinated POPs are interacted with liquid sodium, sodium fluoride may accumulate as a byproduct in the liquid sodium. The sodium fluoride would need to be purged once the concentration in the molten sodium becomes so high that the molten sodium is no longer pumpable or effective at removing and destroying the POPs from the stream. The purge can be performed as batch or continuous removal. Particularly, a continuous system would provide for a continuous or semi-continuous addition of fresh sodium metal and the removal of a continuous or semi-continuous slip stream to remove a portion of the bulk liquid sodium that comprises accumulated byproducts.

Such reactive metal scrubbing systems can be used upstream of aqueous-based caustic scrubbing systems (which are commonly the source of aqueous based POP-comprising waste streams) to remove and destroy the bulk of the POPs prior to the aqueous scrubbing system. Alternatively, the scrubbing system can be eliminated altogether. As a result, the POP emissions are decreased from the plant. Since the reactive metal scrubbing systems can actually destroy the POPs (unlike caustic scrubbing systems that capture and neutralize the POPs but leave them essentially chemically unchanged), they can be much more effective in eliminating POP emissions, possibly even to the point of eliminating a POP-comprising aqueous waste stream altogether.

If the absorption of the POPs from the gas stream into the liquid reactive metal is rapid and highly efficient, a reactor (such as a stirred tank) may be sufficient. However, in situations wherein the absorption and destruction of the POP in the liquid metal is not efficient, and a significant fraction of the POPs that are bubbled through the liquid metal pass through the liquid unreacted and unabsorbed, multiple reactors may be required. Alternatively, the gas can be recycled multiple times through the reactor using methods well known in the art, such as through the use of gas compressors.

In some embodiments, a plug flow reactor can be employed. Specifically, a POP-comprising stream can be combined with a liquid sodium stream such that the resulting stream remains primarily liquid sodium. The mixture can then be pumped through a pipe where the liquid sodium is heated using any suitable method to about 300-700° C. for a brief period of time. For example, electricity can be passed through the reactive metal directly to help destroy the POPs and potentially regenerate the metal from the hydroxide form back to the metallic form. Alternatively, because metallic sodium is conductive to electricity, induction heating may be employed to efficiently heat the sodium.

The mixture can then be cooled as it progresses through the pipe. Because the vapor pressure of the sodium will rise relatively little with such extreme temperature increases, high temperature destruction of the POPs can be accomplished very rapidly and efficiently using a relatively small amount of equipment. The stream can proceed directly through filtration devices to remove solids, such as carbon or NaF particulates. The stream can be recirculated, receiving fresh POP-comprising streams that are circulated around the loop, wherein the POPs are destroyed by the end of the loop. One preferred embodiment of this invention to ensure this result (of intimate contact of gases, liquids, and the break up of solids until the reaction is complete) is a circulating loop of reactive liquid, into which the stream to be destroyed is slowly added in multiple points, in which loop (or piping) are placed static or dynamic (magnetic or other) stirring mechanisms to mix gases, liquids and to break up solids, and in which loop there may be heated zones for increasing the reaction rates, and cooling zones for the selective precipitation of certain species along with the filtration of said species at various points along the piping loop. Furthermore, toward the end of the piping loop, fresh reactive metal can be added to further drive the reaction and ensure no halogen or other species remains unreacted.

If the concentration of sodium hydroxide as a byproduct with the water reaction increases to the point where the sodium metal is less effective at destroying fresh POP's, then a slip stream can be removed (in a continuous process), and that sodium/sodium hydroxide combination can be further reacted with water to make sodium hydroxide for use or sale.

As they accumulate in the reactive metal liquid scrubbing medium, byproducts (e.g., NaF in the case of fluorinated POPs) may be removed by taking the liquid reactive metal and crystallizing the NaF in a crystallizer (e.g., typically by dropping the temperature using methods known in the art). If byproduct spontaneously precipitates due to reaching saturation in the liquid metal, it can be filtered out of the molten metal using a filter (e.g., stainless steel or glass filter medium). NaF melts at over 900° C., higher than sodium metal. It is expected that as the molten scrubbing/reaction solution is reused and the NaF concentration increases, NaF crystals may begin to precipitate out and facilitate filtration. Thus, the removal of metal halide salts can be accomplished using the disclosed system and method. The recovered NaF may be pure enough to be sold or further purified for sale, thus enabling a POP waste stream to be converted into a value-adding product. $F_2$ can be used to treat the recovered NaF to remove any remaining metallic sodium, thereby producing a pure NaF stream. $F_2$ or $Cl_2$, etc. gas likewise may be used to treat other streams in the present invention to react with residual or unwanted molten alkali metal, such as in purification steps to form salts and remove highly reactive alkali metal on equipment or products or byproducts from the present reaction.

One advantage of using molten sodium and reactive metals to destroy POPs is that the temperature can be raised significantly to increase the rate of reaction without significantly increasing the pressure of the reaction and equipment. Thus, POPs can be destroyed more effectively and rapidly compared to prior art methods by using the sodium more efficiently and allowing the overall system to be smaller in design.

In some embodiments, sodium metal can be used as the transport medium in eductors (e.g., ejector pumps, aspirators, venturi pumps, etc.). Such eductors are used to draw vapors away from chemical processing equipment, such as reactors and tanks. Commonly, steam or water is passed through an eductor or venturi tube to draw a vacuum on process streams in an effort to remove vapors from process reactors. Liquid sodium can be effectively used for this purpose because it has a very low vapor pressure, even at elevated temperatures. As a result, high levels of vacuum can be achieved (low absolute pressures). For example, Argonne National Labs report ANL/RE-95/2 shows that liquid sodium has a vapor pressure of one one-thousandth of an atmosphere at 700 degrees Kelvin or over 400° C. Liquid sodium pumped through a venturi tube at this temperature can draw a vacuum lower than 1 mm Hg on a process reactor, in addition to providing high reactivity and intimate mixing to quickly and efficiently destroy halogenated chemicals without the need to mix them with water or other streams and generate more waste to be treated. Creative Engineers, Inc. makes electromagnetic liquid sodium pumps with no moving parts that can be used to pump the liquid sodium through the educator.

It will therefore be appreciated that liquid and solid POP streams can be destroyed with a reactive metal system as disclosed herein. The more concentrated the POP is and the higher the volume relative to the reactive metal stream, the more care must be taken to safely add it to prevent excessive exotherms and gas evolution.

Prophetic Example 15

Process Example

An aqueous waste stream comprising 0.1% fluorinated POP (Stream 1) totaling 100 pounds per hour can be obtained. A stirred tank comprising at least 10,000 pounds of liquid sodium at 200° C. is also obtained. A pump-around loop/plug flow reactor is configured to draw fluid from the tank and pump it through a loop using sodium pumps (e.g., similar to those manufactured by Creative Engineers) operating in excess of 1000 pounds per hour (Stream 2). The pump pushes Stream 2 through a stainless-steel filter, where any solids (e.g., NaF, NaOH, carbon particles, etc.) are removed. Downstream of the filters, Stream 1 is added to Stream 2 in a section of high-pressure piping (for safety) that turns upward to allow the evolved $H_2$ gas to help move the liquid upwards. The combined mixture is Stream 3.

In the vertical rise, the fluid enters a heating zone that heats the fluid to 500-800° C. with a residence time long enough to destroy all of the POPs in the stream. The diameter and configuration of the piping is designed to give the desired mixing and residence time. The destruction of the POPs can be accomplished by adding the Stream 1 directly to the stirred tank. However, adding it into the pump around loop ensures that the mixture of sodium and waste are intimately contacted in a pipe where the zones of reaction and reaction products (e.g., gases that are rapidly forming with explosive force) can be kept together long enough to ensure that the POPs see high temperature zones in intimate contact with the sodium for a controlled residence time.

Stream 3 is then cooled and added directly back into the stirred tank that serves as a disengaging space for the release and separation of the gases from the liquid sodium. If run as a continuous operation, fresh molten sodium can be continuously added to the tank at a rate equal to the rate of consumption of sodium in the reaction while a slip stream can be continuously removed downstream of the filters. The slip stream can be further reacted with water to produce a caustic solution useful in other parts of the process or for sale. Vapor emissions can include hydrogen and other gases, depending on reaction conditions which can be removed in downstream caustic scrubbers and disposed of using standard techniques. For example, the hydrogen gas can be burned for energy (e.g., to heat the sodium), collected for sale, and/or converted to electricity in a hydrogen fuel cell.

Prophetic Example 16

Production of Byproducts

The presently disclosed subject matter also includes a system and method for producing byproducts from the disclosed method. For example, metal salts, metal oxides, metal sulfides, and the like produced from contacting the reductant and the oxidants in the treated stream. Suitable byproducts can include (but are not limited to) sodium hydroxide (when the feed comprises water), sodium fluoride (when the feed stream comprises carbon-fluorine bonds), sodium chloride (when the POPs comprise chlorine atoms), sodium bromide (when the POPs comprise bromine atoms), and/or fine carbon particles.

In some embodiments, the disclosed method can be performed on a gaseous process stream (e.g., natural gas) to remove unwanted species, molecules comprising C—S, C—N, and C—O bonds, $CO_2$, and moisture.

Prophetic Example 17

Aqueous Streams

The disclosed system and method can be used with aqueous streams wherein the water is intended to be mostly consumed by the sodium in the reaction, such as aqueous streams where a more complete destruction of the halocarbon or POPs is desired.

Specifically, sodium powder, pellets, liquid, etc. can be added to an aqueous stream to react with halocarbons in the presence of water or water vapor. In some embodiments, the term "aqueous stream" refers to a liquid stream with greater than 50% by weight water content. However, the presently disclosed subject matter is not limited and suitable aqueous streams can have a larger or smaller percentage by weight of water. Both streams with greater than 50% and those with less than 50% are envisioned to be treatable. However, the higher the water content, the higher the safety concern due to the explosive reaction of water and sodium. In addition, the higher the water content, the more sodium will be consumed in the making of caustic, and the more competing reactions will interfere with the ability of the sodium to destroy the halocarbons.

Water will also react with the sodium to form sodium hydroxide and hydrogen. The addition of sodium to the stream must be slow enough to safely remove the heat from the reaction and vent the hydrogen. Halogenated POPs will also be destroyed, forming HX which is neutralized by the hydroxyl (OH—) created to form the metal halogen salts (such as NaF, NaCl, NaBr, etc.). In some embodiments, the addition of the reactive metal can be accomplished by providing a stirred tank into which metallic sodium is slowly added from a hopper. A cooling jacket can be used to remove the heat of reaction or an overhead condenser that condenses water vapor can be employed to remove the heat of reaction. However, the presently disclosed subject matter is not limited and any method known in the art to remove heat from a reaction reactor can be used.

An inert gas can be used in the vapor space of the tank to minimize unwanted gas phase reactions. Any known method can be used to increase the rate of reaction (and thus the destruction of halocarbons or POPs), such as increasing the temperature, including pressurized reactions above the boiling point of the solvent (e.g. operating under pressure to achieve liquid water temperatures in excess of 100° C.) or operating in a gas phase (e.g. steam) are also contemplated as techniques that can be used to accomplish a more complete destruction of the halocarbons or POPs. The goal of the reaction is to destroy POP's in the aqueous streams using the addition of metallic sodium, after which the resultant caustic solution with byproducts of the sodium/halocarbon reaction may be sold or neutralized and discarded by normal means. In applications in which liquid or solid reactive metal is added to aqueous solutions comprising POP's, it is envisioned from a safe handling standpoint that relatively small quantities of metal are added to relatively large quantities of aqueous solutions to contain the violent reaction, expansion of gases, and heat being evolved. Likewise, safe operation can be achieved by adding a small quantity or rate of process stream to a large reservoir of reactive metal.

What is claimed is:

1. A method of reducing, reacting, and removing an oxidant in or from a chemical stream, the method comprising:
combining within a reusable reactor one or more molten alkali metal reductants not dispersed in a carrier liquid, and the chemical stream comprising the oxidant and an optional non-reducible chemical species;
heating or maintaining the reactor at a temperature sufficient to melt or maintain the one or more molten alkali metal reductants in a molten state;
reacting the one or more molten alkali metal reductants with the chemical stream, wherein the oxidant in the chemical stream is reduced by the one or more molten alkali metal reductants, is reacted with the one or more molten alkali metal reductants, and is removed from the chemical stream by the one or more molten alkali metal reductants; and removing the reaction products and the optional non-reducible chemical species from the reusable reactor;

wherein the oxidant is a water soluble halocarbon in a mixture with water.

2. The method of claim 1, wherein the water soluble halocarbon comprises at least one C—O, C—S, or C—N bond.

3. The method of claim 1, wherein an excess amount of the one or more molten alkali metal reductants is provided, so that an unreacted amount of the one or more molten alkali metal reductants remains after the reacting with the oxidant in the chemical stream.

4. The method of claim 1, further comprising mixing the one or more molten alkali metal reductants and the chemical stream using a static mixing element, a dynamic mixing element, or both.

5. The method of claim 1, wherein the reusable reactor is selected from a reactor comprising a multiplicity of reactor vessels arranged in series, a reactor with a circulating loop comprising an unreacted amount of the one or more molten alkali metal reductants, a reactor partitioned into a multiplicity of reaction zones, or combinations thereof.

6. The method of claim 1, wherein the non-reducible chemical species is provided, and the non-reducible chemical species comprises nitrogen gas, a noble gas, or a hydrocarbon gas or liquid.

7. The method of claim 1, wherein the temperature is at, near, or above the auto-decom position temperature of the oxidant.

8. The method of claim 1, wherein greater than 99% of the oxidant is reduced, reacted, and removed from the chemical stream.

9. The method of claim 1, wherein the chemical stream is an industrial chemical plant process or waste stream.

10. The method of claim 1, wherein the chemical stream comprising the oxidant is a stream emanating from at least one of an absorber system, an ion exchange system, or a reverse osmosis system.

11. The method of claim 1, further comprising generating a stream of an alkali metal hydroxide or an alkali metal hydroxide caustic solution from the reaction products.

12. A method of reducing, reacting, and removing a water soluble halocarbon from a chemical stream and eliminating or reducing a need for at least one of a scrubber or a carbon absorber to remove the halocarbon from the chemical stream, or an incinerator to destroy the halocarbon in the chemical stream, the method comprising:

combining within a reusable reactor one or more molten alkali metal reductants not dispersed in a carrier liquid, and the chemical stream comprising the water soluble halocarbon in a mixture with water and an optional non-reducible chemical species;

heating or maintaining the reactor at a temperature sufficient to melt or maintain the one or more molten alkali metal reductants in a molten state;

reacting the one or more molten alkali metal reductants with the chemical stream, wherein the halocarbon in the chemical stream is reduced by the one or more molten alkali metal reductants, is reacted with the one or more molten alkali metal reductants, and is removed from the chemical stream by the one or more molten alkali metal reductants; and removing the reaction products and the optional non-reducible chemical species from the reusable reactor.

13. The method of claim 12, wherein greater than 99% of the halocarbon is reduced, reacted, and removed from the chemical stream.

14. The method of claim 12, wherein an excess amount of the one or more molten alkali metal reductants is provided, so that an unreacted amount of the one or more molten alkali metal reductants remains after the reacting with the water soluble halocarbon and the water in the chemical stream.

15. The method of claim 12, wherein the reusable reactor is selected from a reactor comprising a multiplicity of reactor vessels arranged in series, a reactor with a circulating loop comprising an unreacted amount of the one or more molten alkali metal reductants, a reactor partitioned into a multiplicity of reaction zones, or combinations thereof.

* * * * *